United States Patent [19]

Angelo, II et al.

[11] Patent Number: 5,662,050

[45] Date of Patent: Sep. 2, 1997

[54] PROCESS FOR CHEMICAL/THERMAL TREATMENT WITHOUT TOXIC EMISSIONS

[76] Inventors: James F. Angelo, II, 949 Eagle, Fayetteville, Ark. 72701; Wilbur L. Kephart, 324 Sugarwood Dr., Knoxville, Tenn. 27922

[21] Appl. No.: 517,952

[22] Filed: Aug. 22, 1995

Related U.S. Application Data

[63] Continuation-in-part of Ser. No. 435,572, May 5, 1995.

[51] Int. Cl.[6] ........................................... F23D 3/00
[52] U.S. Cl. ........................ 110/246; 110/346; 432/103
[58] Field of Search .................................. 110/226, 246, 110/247, 346; 432/103, 105

[56] References Cited

U.S. PATENT DOCUMENTS

| | | | |
|---|---|---|---|
| 4,834,648 | 5/1989 | Angelo, II | 432/103 |
| 5,179,903 | 1/1993 | Abbound et al. | 110/345 |
| 5,309,850 | 5/1994 | Downs et al. | 110/235 |

*Primary Examiner*—Henry A. Bennett
*Assistant Examiner*—Pamela Anne O'Connor
*Attorney, Agent, or Firm*—Stephen D. Carver; Trent C. Keisling

[57] ABSTRACT

An apparatus and process for chemically and/or thermally treating substances containing or generating toxic substances during treatment is disclosed. Multiple reactors treat the material while the toxic emission containment system separates and cleans the effluents to within acceptable emissions limits as specified by government. The preferred rotary kiln employs a multiple zone reactor system for processing and volumetrically reducing feedstocks. The kiln functions as a primary treatment chamber and contains a rotatable multipurpose admixture and a multiple zone burner system. Induced cyclonic action reduces particulate entrainment, minimizes stratification, and maximizes gas residence time. A direct fed, second stage vitrifying, refining and/or separating furnace yields stabilized products. The preferred process includes an air pollution control system enhanced by a toxic emission containment system which separates the inert effluents from the toxic emissions contained in the treatment process. The toxic emissions are contained, recycled for further treatment or rendered inert. Whenever coolants are inserted directly into the process to lower treatment temperatures, off-gas recycle is used to minimize the quantities to be cleaned. When combustion is an integral part of the thermal treatment process, enriched oxygen is used to displace the nitrogen in the combustion air to reduce the quantities of toxic emissions generated and the quantities of off-gas to be treated downstream of the air pollution control system. Unused admixtures, solid, liquid and gaseous by-products can be isolated.

10 Claims, 9 Drawing Sheets

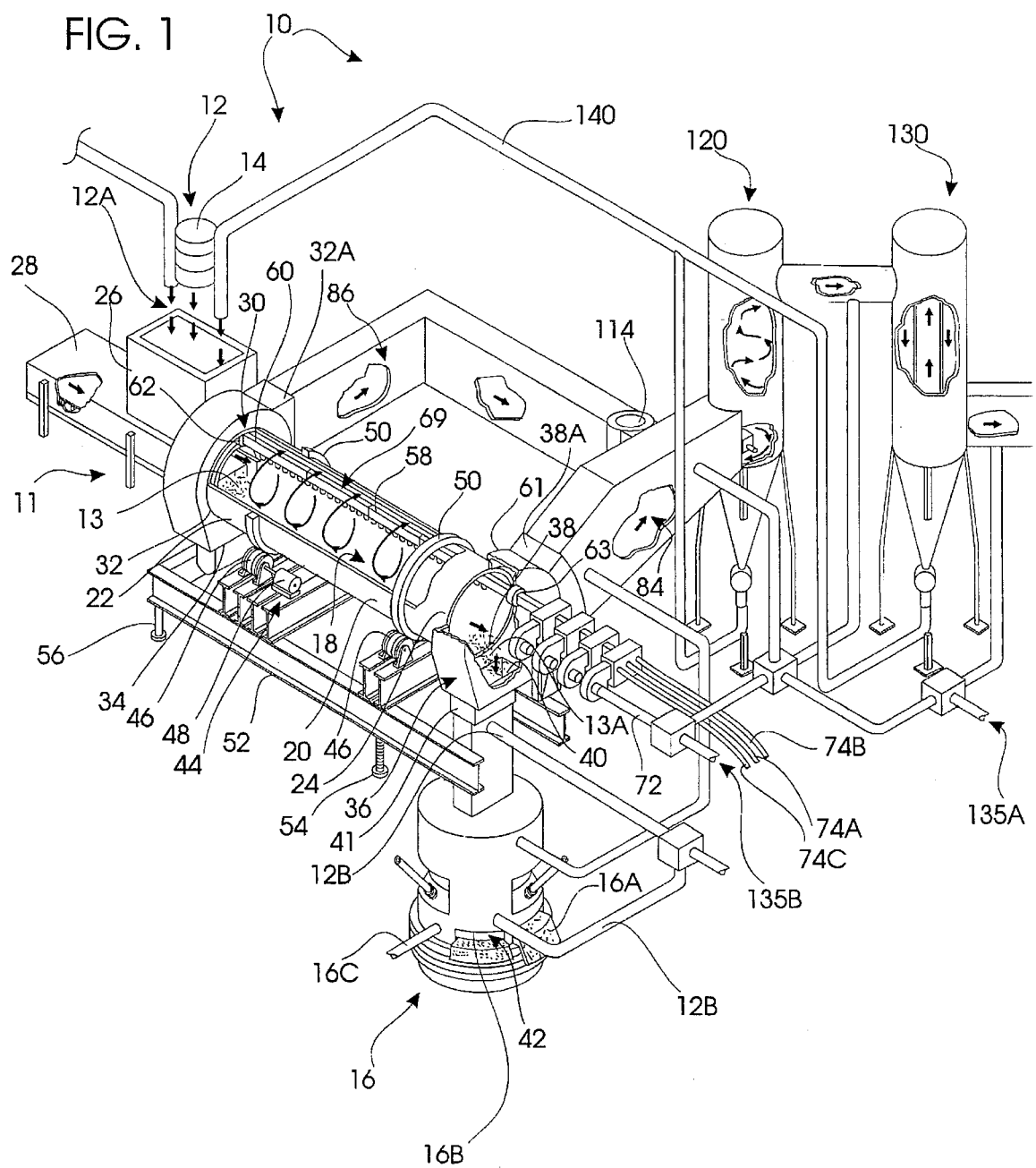

PROCESS FOR CHEMICAL/THERMAL TREATMENT WITHOUT TOXIC EMISSIONS

CROSS-REFERENCE TO RELATED APPLICATION

This application is a Continuation-in-Part of my prior patent application Ser. No. 08/435,572, filed May 5, 1995, entitled: APPARATUS AND PROCESS FOR CHEMICAL TREATMENT WITHOUT TOXIC EMISSIONS.

BACKGROUND OF THE INVENTION

I. Field of the Invention

This invention relates to the processing of any substance containing or generating toxic emissions and contaminants during treatment at temperatures above 250 degrees Fahrenheit (F). Many of the substances processed are related to the disposal of hazardous materials, including radioactive and non-radioactive hazardous wastes, industrial wastes, mixed wastes, minerals, pharmaceutical wastes, soils, sludges or other potentially toxic wastes.

The treatment categories encompass the following thermal treatment categories: combustion with or without enriched oxidant, for stoichiometric or excess oxidant conditions; pyrolisis and calcination. Preferably, the reactor system comprises a primary rotary kiln combined in series with a secondary, vitrifying, refining, and/or separating reactor or melter for treating solid wastes and a tertiary, thermal gas reactor for treating gases from the kiln and (vitrifier) reactor. Preferably, the reactors cooperatively combust, gasify, pyrolyze, incinerate, calcine, melt, or vitrify solid hazardous and non-hazardous wastes to reduce the volume thereof and to produce a final product in a vitrified "glass-like", ceramic or optional ash form to stabilize and encapsulate leachable constituents and radionuclides. When sufficient quantities of valuable metals are present, the high temperature vitrification reactors can be extended to include the chemical reactors associated with metal refining. The gases produced by the kiln and vitrifier may be further treated in an optional third gas reactor followed by extensive recovery via a gas treatment system that separates the gases and vapors into toxic and nontoxic products, the latter may be recycled, released or treated as a valuable by-product. The toxic products are then reinjected or recycled at selected points in the process. Thus, the process uses the reactor system to maintain the desired treatment conditions to produce a stable, nonleaching, toxic solid product and to produce gaseous, and vapor byproducts that are within acceptable safety limits.

II. Discussion of the Prior Art

It is well recognized that good thermal treatment practices are an integral part of toxic emission generation, control and containment. During the 1980's, the Environmental Protection Agency (EPA) demonstrated consistently that toxic organic substances could be destroyed via combustion at a level that allowed less than 100 ppm of toxic organic substances to be emitted with the flue gas after cleaning. However, during this same time frame, the EPA added many inorganic substances (acid gases, metals, minerals {particulate matter}) to the list of priority (toxic) pollutants.

The toxic substances defined by government are listed and maintained under the uspices of the following legislation and subsequent amendments: Clean Air Act, Clean Water Act, Resource Conservation and Recovery Act, Toxic Substance Control Act, Occupational Safety and Health Administration. The commonality among all Federal legislation is that these regulations represent minimum standards. Thus, individual states may enhance the standards. States commonly enhance two sections of the Clean Water Act, the National Pollutant Discharge Elimination Standards and the Public Owned Treatment Works Standards. All of the above Federal standards appear in the Federal Register. Representative sections include 29 C.F.R. §§1910.101–1910.111 (including Appendix A); 40 C.F.R. parts 15, 25, 61, 100–140, 144–149, 172, 261, 302 (including Appendices A and B), 355, 372 and 400–471. As the government regulations are several and varied, the present invention is not limited to the scope of the current Federal or state regulations. Rather, the present invention is intended to be used with regulations establised by any government entity.

Currently, all of these priority pollutants cannot be destroyed by thermal treatment, although they can be theoretically rendered inert by appropriate chemical and thermal treatments. But an EPA sponsored multiple site program demonstrated this was not occurring in actual practice. For the locations tested, the active toxic substances residing in the solid residuals ranged between 300 ppm to 44,000 ppm. Similar EPA sponsored programs demonstrated that toxic substance emissions could be varied between the solids and the flue gases by varying the manner in which the rotary kiln was operated.

In the field of rotary kiln furnaces used for thermally treating and processing feedstocks with radioactive or otherwise hazardous constituents, it is well known that the thermal treatment chamber is typically heated from one or two ends.

The heating source is typically positioned to direct heat axially from one end toward the opposite end. It is well known that a disadvantageous temperature profile can result when heating a rotary kiln from only one end. To achieve better temperature and chemical control, one solution is to provide a heating manifold or multiple burner system which spans the length of the primary combustion chamber, as seen in prior U.S. Pat. No. 4,834,648, by one of the co-inventors herein. The latter device applies heat throughout the thermal treatment chamber and therefore achieves a more consistent heat transfer to the feedstocks during the treatment in the rotary kiln.

However, it is well known that heating manifolds are susceptible to structural failure caused by extreme heat generated during kiln operation. Also, typical heating manifolds do not establish successive, controllable heating zones or operating modes along the length of the primary combustion chamber in the rotary kiln. It is also known that selective monitoring and control of the heating manifolds or burners is necessary to insure proper thermal and chemical treatment of the selected feedstocks. Conventional rotary kilns may not be selectively monitored and controlled in a plurality of successive zones.

It is often necessary to modify the flame characteristics according to the heat energy required to thermally treat the particular feedstocks being processed. However, with inadequate means for monitoring the process activity and temperatures within the rotary kiln, it cannot be known whether the particular flame characteristics need changing.

In traditional rotary kiln systems, material in transition zones (i.e., zones where the feedstocks transition from ashing to slagging modes) tends to accumulate and form "donut" rings around the combustion chamber periphery. This "donut" ring impedes thermal treatment and feedstock flow, and it can eventually cause kiln failure. Failure can result from a "donut ring" of slag falling off and tearing off kiln refractories in the process, thereby plugging the discharge outlet and shutting down the entire process. This typically necessitates extensive maintenance, requiring excessive down time. Therefore, means must be provided for the prevention or removal of waste slag or "donut ring" buildup to prevent failure and system shutdown.

Other rotary kilns have been developed for the thermal processing of selected feedstocks. Several prior art devices are disclosed in my following U.S. Patents: U.S. Pat. No. 4,037,543 issued on Jul. 26, 1977; U.S. Pat. No. 4,635,568 issued on Jan. 13, 1987; U.S. Pat. No. 4,734,166 issued on March 29, 1988; U.S. Pat. No. 4,808,286 issued on U.S. Pat. No. 4,834,648 issued on May 30, 1989; and U.S. Pat. No. 4,934,932 issued on Jun. 19, 1990.

U.S. Pat. No. 4,834,648, which is the closest related patent to the present invention, discloses a kiln for calcining selected feedstocks. This device is intended for use only in a calcining mode. U.S. Pat. No. 4,834,648 directly addresses the fundamental deficiencies of traditional rotary kiln systems, and it is not subject to the effects of material transitioning between molten and ash modes.

An advanced configuration is reflected in U.S. Pat. No. 5,179,903, entitled Closed Loop Incineration Process and shows one method for reducing stack emissions. The methodology advanced incorporates the utilization of oxygen enrichment with flue gas recycle. However, this invention fails to effectively address the potentially toxic emissions leaving in the solid effluent. Also, the invention fails to provide effective methods to deal with the further reduction of metal and particulate matter emissions, byproduct combustion gases, waters and potentially toxic carcinogens.

The above mentioned patent also includes the utilization of an air pollution control system (APCS). The APCS was the first configuration to be designated as the best demonstrated available technology (BDAT) by the EPA. Later EPA sponsored test and reports demonstrated that other APCS configurations were capable of achieving similar results (i.e., an average of 250 ppm of potentially toxic emissions in the effluent). Of course, the toxic emissions generated during the thermal treatment process depends upon the manner in which the thermal reactors are operated.

Various solid, liquid and gaseous byproducts may be generated during pyrolytic, calcination or substoichiometric operating conditions. Thus, a desirable treatment process for hazardous and toxic materials would ideally comprise an APCS with improved thermal reactor design to provide effective combustion while containing all of toxic products.

Normally toxic emission are emitted with one or both of the solid and gaseous effluents in various proportions. An effective process would contain these toxins while permitting the conversion of carbon dioxide, a byproduct of combustion and a leading greenhouse gas into an industrial grade commodity. Ideally, the process would provide for the containment and cleaning of the water generated during the operation, and for the containment and/or recycling of all organic and metal carcinogens as well as other contaminants which may be present.

An improved thermal treatment configuration would provide a rotary kiln functioning in tandem with other thermal devices to improve the operating efficiency of the overall process. A preferred secondary solid thermal reactor & melter device would be operated within a temperature range between 500 degrees F. to 3000 degrees F. bath temperature, depending upon feedstock characteristics and the desired objective (e.g., containment of toxic emissions, product enhancement and/or separation in addition to containment of toxic emissions), to cooperatively produce a desired, stable product.

Preferably, the rotary kiln would incinerate and thermally treat at temperatures above 250 degrees F. without the release of toxic emissions to the environment. The kiln could encompass the following thermal treatment categories: combustion with or without an enriched oxidant, for substoichometric, stoichiometric or excess oxidant conditions, pyrolysis and calcination. Of course, an advanced kiln would permit the selective addition of ingredients other than the solid process feedstock (e.g., fuel, oxidant, liquid feedstock, water, flue gas, chemical admixtures, etc.).

A desirable overall process would require the separation of toxic emissions generated during thermal treatment and contained in the gaseous effluents, which pass through traditional air pollution control systems. Preferably, after these gaseous toxic emissions are separated from the inert gases produced during thermal treatment, the toxic emission would be recycled in such a manner as to render them inert. A preferred rotary kiln operating in series with a vitrifier, a thermal gas reactor, an APCS and a toxic emission containment train would significantly reduce unstable toxic emissions to environmentally acceptable quantities. The maximum anticipated toxic emissions leaving this processing configuration would be 44,000 ppm in the stabilized solid effluent and 250 ppm in the gaseous byproducts.

Further, a particularly preferential process could contain the two inert gas fractions of water vapor and oxygen to advantageously recycle them. Also, the process should release only two gaseous byproducts, industrial grade nitrogen and carbon dioxide. These gases are produced during stoichiometric or excess oxidant processing conditions. The N2 and CO2 are contained, held, and tested before release to the environment.

SUMMARY OF THE INVENTION

The subject treatment process cooperatively combines a novel reactor configuration and a gas treatment system to chemically treat feedstocks containing or generating toxic emissions and other undesirable contaminants, to produce stable, nonleaching solid products and acceptably safe, gaseous, byproducts. During pyrolytic, substoichometric or calcining operations, other inert gaseous liquid and solid byproducts can be separated, cleaned and stored in a similar manner, if desired.

Preferably, the reactor configuration comprises three reactors that thermally treat the feedstock while containing all toxic emissions. The process uses a complex toxic emission containment train downstream of a conventional APCS to separate and cleanse commercially valuable gaseous byproducts while recycling residual, potentially toxic emissions back into the most appropriate reactor.

The purpose of the simultaneous use of two solid/liquid reactors and an optional gas thermal treatment reactor is to improve the quality of products produced and to provide a receptacle where recyclable materials are subjected to further treatment.

The first reactor, the rotary kiln, primarily introduces admixtures which will enhance the desired reactions or throughputs and separates the solids from the water and other organic substances which volatilize below the eutectic point of any toxic substance which may be present.

The second reactor extends the chemical/thermal treatment range above the minimum eutectic point of the solids, leaving the rotary kiln while economically removing any water, inorganic and organic residuals from the solids with eutectic points below 1800 degrees F. and where the solids are scheduled for further treatment at higher temperatures. The second reactor also produces a stabilized (vitrify, solidify, make immobile, etc.), potentially toxic substance that is nonleeching. This stable product satisfies all applicable federal or state guidelines and regulations for disposal of hazardous substances. The second, vitrifying solid reactor has provisions for adding admixtures as necessary and removing multiple stable, nonleachable products. Heat can be added to this reactor in a variety of well-known, conventional methods including plasma arc, electric arc and joule devices as well as other similar devices.

The above reactor combination has been designed for thermally processing, treating, and volumetrically reducing selected feedstocks. It has the capability of vitrifying and stabilizing feedstocks to render them suitable for environmentally safe disposal (i.e., burial) or beneficial reuse. Typical feedstocks include radioactive and non-radioactive toxic or hazardous wastes, as well as municipal solid wastes, industrial wastes, soils, sludges and minerals and like substances.

An advanced, slagging and vitrifying cyclonic rotary kiln thermally processes, treats, and volumetrically reduces selected feedstocks. The system preferably comprises a primary, generally horizontal, thermal treatment chamber which defines a substantially cylindrical wall opened at both ends. Selected feedstocks (including their containers, if so desired) are introduced into the kiln through a shredder and feeder arrangement that blends and homogenizes the feedstock. To output the desired "glass-like" or "ceramic-like" end product when operating in the vitrification mode, an admixture of materials such as sandy soils, siliceous materials, glass, shale, or iron-enriched basalt, etc., may be introduced, as necessary, into the thermal treatment chamber along with the waste feedstocks.

The feedstocks and optional admixtures are thermally processed and treated together. When the system is operated in a slagging or molten mode, a final waste form of glass-like or ceramic-like frit which stabilizes and encapsulates otherwise leachable constituents and radionuclides results. Thus, transformed contaminants are stabilized and prevented from leaching into the soil and ground water. Further, the end product provides a superior form for final burial or beneficial reuse such as an aggregate in concrete containers utilized for radioactive materials or contaminants storage and burial. When the rotary kiln is operated in this mode, the second solid thermal treatment reactor may not be required.

The rotary kiln thermal treatment reactor chamber is supported at both ends by entrance and exit chambers or breechings. The rotary kiln thermal treatment reactor chamber is rotatably mounted and sealed within each of the entrance and exit chambers for rotation about its longitudinal axis. The variable speed rotation imparting means is secured to a frame or undercarriage, the frame having a plurality of leg members for structural support. At least one pair of the leg members is adjustable to control the angle of repose of the rotating chamber and thus control the velocity of feedstock flow during thermal treatment, as well as bed depth and retention time of the feedstocks within the system.

A multi-purpose burner manifold may also function as a staged combustion system. The pivotally adjustable manifold is disposed within the thermal treatment chamber and is supported at both ends by the entrance and exit chambers or breechings. The staged combustion system thermally treats the feedstocks, effectuating volumetric reduction and vitrification and stabilization of the feedstocks with or without admixtures.

The preferred burner manifold comprises a plurality of independently controllable zones. Each successive zone comprises multiple burners that each have multiple burner tips that are quickly changeable. The burners propel the flame toward the feedstocks at a selected, rotatably adjustable angle. Characteristics of each flame, including at least the geometry, temperature, intensity and velocity, and chemical composition are variable. The burner manifold is positioned within the thermal treatment chamber such that the flames propelled by the individual burners are usually substantially tangential to the cylindrical wall of the thermal treatment chamber in order to directly transfer heat energy to the feedstock traveling through the apparatus, maximizing conduction, convection and radiation conditions. However, to alter the heat transfer rate or to eliminate stratification of the gas layers in the rotary kiln, the burners may be pivotally adjusted to a selected position. The latter construction establishes an adjustable, desirable, helical flow pattern of the gases and fine particulates in the chamber.

A gas effluent created by the thermal treatment and processing of the feedstocks entrains particulate matter. This entrainment may be altered and/or diminished by the multi-purpose manifold positioning and other variables discussed hereinafter. The gas effluent is evacuated from the thermal treatment chamber through either the upper solids entrance chamber or breeching or through the lower exit chamber or breeching through one of the gas exhaust channels. The direction of flow through the primary combustion chamber of the rotary kiln is controlled by a Y-valve which serves to select the channel or duct through which the gas and effluents are evacuated. Gas flow may be selectively established co-currently or countercurrently. The gaseous exhaust typically is cycled through any selected secondary combustion chamber and an air pollution control system so that the exhaust may be recycled or reused or safely released to the environment, providing no other toxic emissions or contaminants are present.

Much of the particulate matter which may have been initially entrained in the rotary kiln thermal treatment chamber or reactor gas effluent is centrifuged out of the gas stream by the centrifugal forces resulting from the rotation of the combustion chamber wall or periphery and the helical flow patterns created by the tangentially directed flames or combustion air. Centrifugal force benefits can be maximized by selective fine tuning and positioning or pivoting of multi-purpose burner manifold or staged combustion air injection system.

The staged combustion system of the preferred embodiment may be controlled to operate the rotary kiln in a slagging mode, an ashing mode, or both simultaneously and in combination. Each mode is temperature-independent of the other within successive, independently controllable zones.

To provide for the operation of the multiple purpose manifold to achieve operation in both the slagging and ashing modes simultaneously, a plurality of longitudinally successive treatment zones are provided, each of which includes a plurality of longitudinally successive burners and admixture injection nozzles. Each burner or injection nozzle comprises a plurality of quick connect type tips, which may be easily changed to alter output characteristics. Each longitudinally-successive zone may be selectively and independently operated in the slagging (molten) or ashing mode. When the fuel (i.e., natural gas, LP gas or oil) is turned off and the oxidant is on, then the multiple burner alternatively functions as a staged oxidant air injection system. Other admixtures can be added in a similar manner.

The longitudinally-successive and independently-operable treatment zones precisely control the thermal and chemical conditions inside the rotary kiln. The resultant gas effluent characteristics such as velocity, internal temperature and chemical profile throughout the rotating combustion chamber are precisely controllable. Control of the temperature profile reduces waste buildup on the interior refractory surface of the rotary kiln combustion chamber which may occur as result of a buildup of material in the transition zone between the ashing zone and the slagging zone. In the transition zone, this buildup of slag is typically in the form of an undesirable "donut ring." Flame temperature and velocity may be increased to attenuate build up of slag, which may be melted, dissipated, or longitudinally moved toward and eventually discharged from the rotary kiln via the discharge outlet breeching.

Each treatment zone of the multiple burner is provided with a separately operable cooling or combustion air blower, a fuel component delivery system, an oxidant component delivery system and a third delivery system for other admixtures. These admixtures include air, oxidants, accelerators, coolants, sorbents, reducers, stabilizers, inhibitors, recycled flue gases or constituents therefrom, and other liquid, gas or powdered substances as necessary to produce the desired end product. These supplied components are combined at the aperture tips. The supply of the components are separately controllable by a suitable, conventional valve arrangement. Chemically compatible components may be produced. All of the components are interchangeable at the valve connectors so that the different components may be supplied to the aperture tips by any supply line.

Generally, the tips are directed toward an ignition source to ignite and create the selected flame. The flame shape, temperature, intensity, velocity, chemical composition and flame direction may be selectively changed or altered or enhanced. The flame or spray pattern characteristics may be altered by increasing or decreasing any or all of these elements within the longitudinally successive groups of apertures within a given zone. The variation of the flame characteristics further benefits the efficiency of the present thermal treatment system by varying the cyclonic velocity of the swirling gases traversing the thermal treatment chamber.

The burner manifold carries an igniter for igniting one of a plurality of longitudinally successive burners within a selected treatment zone. The burner igniter is an electric spark generator and is protected and cooled by cooling air or media or combustion air or media within the multi-purpose burner manifold and positioned at the burner tips. In order to protect the combustion air, fuel, oxidant and admixture delivery systems within the multiple purpose manifold, and further to protect the structural integrity of the multiple purpose manifold from the adverse effects of intense heat, a cooling jacket surrounds the multiple purpose manifold. The multiple purpose manifold includes a shell member dimensioned to loosely surround the multiple purpose manifold. An annular volume is defined between the multiple purpose manifold and the cooling jacket through which a selected cooling medium is passed.

When water is employed as the cooling medium, it may become a pre-heated feed water for a heat exchanger or boiler which may be included in the processing configuration.

Insulation further protects the multiple purpose manifold or oxidant injection system on its outer surface where it may be attacked by hot and corrosive gases in the rotary kiln. The insulation is a castable, ceramic or gunned plastic or concrete-type refractory mixed with titanium, nickel-chrome, ceramic fibers, or the like to enhance strength and anchoring properties. The insulation may be a monolithic, prefired shape. The insulation protects the multiple purpose manifold or oxidant injection system from high temperatures and corrosive constituents and impingement thereof within the thermal treatment chamber as well as potential mechanical abuse (i.e, sandblasting effects) from the gases and entrained particulate within the rotary kiln primary thermal treatment chamber. Further, the insulation is corrosion resistant and therefore protects the structural integrity of the multiple purpose manifold from chemical attack.

Anchors for maintaining the position and integrity of the insulation are secured to the outside surface of the cooling jacket. Anchors and fibers mixed with the refractory material to comprise the insulation help cooperatively secure the insulation to the cooling jacket.

A plurality of data collecting devices (i.e., thermocouples, or gas sampling acquisition systems) are preferably supported by and mounted internally and externally to the multiple purpose manifold at selected locations in order to continuously monitor temperature and gas composition within the longitudinally-successive zones.

After selective heat treatment processing, feedstock byproduct is passed through an outlet defined by either the exit chamber or breeching. Treated material such as ash, metals, or slag, flows directly into a vitrifier or melter. A conventional vitrifier with plasma or other suitable heating device is preferably employed to receive directly, by gravity, ash, slag or metals from the kiln and thermally treat, process and separate the treated materials into a several end products. Of course, the end products must be stored and tested prior to release from the system. In some operating situations, other products may also be produced. A vitrified end product from the vitrifier may be produced which, when cooled, would produce a "glass-like" or "ceramic-like" end product.

A stream of glass-like, or ceramic-like material flows out tap holes from the vitrifier, tap holes for other products can also be provided. Typically, the slag stream would contain a large percentage of the radionuclide contaminants. These flow to the burial box, etc. The material is evacuated in a vitreous form and is ready for disposal, after being stored for cooling and testing prior to release from the system. Leaching potential of the outputted material is thus diminished or eliminated. The vitrified, stabilized end products may have beneficial reuse and recycled potential. The process may be operated in an "ashing" or non-molten, non-vitrified mode also wherein stabilized ash is the end product.

The third chemical/thermal gas treatment reactor extends the treatment period for the gasses exiting the rotary kiln and the solid vitrifying reactor. These off gases commingle prior to entering this third reactor during stoichiometric and excess oxidant operating conditions. This reactor may selectively function during other modes of operation. Where applicable, admixtures, recyclable substances, fuel, oxidants and gaseous feedstocks may be inserted into this reactor. When further chemical/thermal treatment of the off gases is not required, usually during pyrolytic, substoichometric or calcining operations, either or both the rotary kiln and the solid vitrifier reactor off gases can go directly to an APCS unit operation. The off gases may also be directed through a series of cyclone(s) proceeding the APCS to remove excess particulate matter entrained in the off gases. The excess particulate matter collected in the cyclone(s) is recycled to the solid reactor if potentially toxic substances are present.

Of course, depending upon the feedstock, the rotary kiln and/or second, thermal treatment reactor (vitrifier) off gasses may be diverted to an intermediate condenser, an absorption tower or any other gas-liquid separation device prior to entering the APCS or the toxic emission containment scheme in order to separate valuable by-products. The appropriate pathway is determined by the characteristics of the feedstock and/or the value of the byproducts scheduled for recovering. The utilization of one or more gas/vapor condensors and/or an absorption tower in the configuration with or without the use of a gaseous reactor or the APCS is included in the scope of this Invention.

The containment of all toxic emissions includes the separation of three inert gases/vapors usually present in the process: water, nitrogen and carbon dioxide, especially during stoichiometric or excess oxidant operations. Normally the water is recycled to the APCS. If released to natural conveyances, it can be cleaned to the appropriate standards by conventional water treatment systems. The nitrogen and carbon dioxide can be cleaned to industrial product specifications while containing potentially toxic emissions in a toxic emission containment train.

Any other inert gas present may also be cleaned to industrial grade standards while containing potentially toxic emissions. The containment of all toxic emissions (particulate matter, acid gases, metals and organics) normally requires three-unit operations to be performed in series: subcooling; absorption; and membrane separation.

Subcooling is not required, if the relative humidity of the off gases falls below 20%. The typical APCS gaseous effluents are saturated and are between 150 degrees F. to 200 degrees F. Subcooling these gases below 120 degrees F., preferably below 100 degrees F., removes over 90% of the water present and reduces by 25%, the quantity of gases to be subjected to further treatment. In addition to removing nearly all of the water, subcooling will remove most of the remaining particulate matter, metals and heavy organics.

On occasion, this dirty water can be directly recycled. The preferred method is to separate the water from the contaminates in a porous membrane configuration with the retentate recycled to the solid thermal treatment and vitrifying reactor and the permeate, the clean water, recycled to the APCS. If the water is not recycled, it may be necessary to modify the porous membrane configuration and/or provide additional chemical treatment, (e.g. ph adjustment, etc.) to adhere to local discharge specifications.

Absorption is the second unit operation in the toxic emission containment train. Its purpose is to remove and clean the remaining primary inert gas component, carbon dioxide. When the mass quantities of carbon dioxide fall below 20% of the remaining gaseous effluents, this absorption operation is not required. The carbon dioxide can be separated with dense phase membranes and the residual carbon dioxide remaining in the retentate can be returned to one of the thermal reactors without having a significant effect on thermal treatment. Other residual acid gases and particulate matter will also be removed by the inorganic absorbent but will be contained when the carbon dioxide is released from the absorbent. An inorganic absorbent is preferred to simplify the detection of potentially toxic organic emissions. If toxic emissions are present, and cannot be removed in the stripper column or contained in the absorbent during the regeneration of the carbon dioxide, the contaminated carbon dioxide will be isolated and returned to the rotary kiln or the gaseous thermal reactor for further treatment. To minimize contaminated carbon dioxide recycle, a dense phase membrane unit may be installed after the regeneration column, since carbon dioxide is very permeable relative to other gases. Any contaminates will remain in the retentate and are recyclable.

The utilization of condenser/absorption column technology may be incorporated into the domain of this invention to separate and cleanse either organic or inorganic byproducts laminating directly from the aforementioned rotary kiln, solid vitrifying treatment reactor configuration and whenever the off-gases from either or both of these unit operations can not be directly released to the environment. This mode of operation is most likely to occur during pyrolytic, substoichometric or calcining modes of thermal treatment; however the determining parameter is the economic value of the byproducts produced in the thermal treatment reactors. Also, this condenser/absorption unit operation may differ from the subcooling/absorption unit operation, described primarily for use with stoichiometric or excess oxidant thermal treatment. For either configuration, the final separation/containment technology is the utilization of membrane technologies and the return of the potentially toxic emissions to the most appropriate reactor.

The utilization of condenser/absorption technology for byproduct recovery may be quite similar to the condenser/absorption technology used in this invention to separate and clean carbon dioxide; however, it most likely will not. The subject off-gases will be at least 500 degrees F., not between 150 degrees F. to 200 degrees F. leaving the traditional APCS and may not be saturated. Direct or indirect cooling may be utilized with or without the absorption columns. Inorganic or organic absorbents may be used depending upon off-gas compositions and the byproducts to be recovered. Multiple absorbents may be used. Also the absorbent (s) may be used as a cooling media. Most likely, it will be necessary to intermittently clean the absorbent(s), unless they become an integral part of the product. Reconstitution of the absorbent(s) may be done continuously or intermittently by utilizing chemical, thermal or membrane technology. If membrane technology is selected, porous, rather then the dense phase membranes employed in gas separation should be used. The residuals from the reconstitution of the absorbent(s) should be recycled to one of the thermal reactors: the organics to the rotary kiln; the inorganics to the solid vitrifying reactor. If the byproduct recovery off-gases contain less than 100 ppm or organics they should be directed to the subcooler, unless the relative humidity is less than 20% and the temperature is less then 100 degrees F. If these off-gases also contain less than 20% carbon dioxide, they can be directed to the dense phase membrane unit operation otherwise these residual off-gases should be directed to dense phase the subcooler, unless the relative humidity is less than 20% and the temperature is less than 100 degrees F. If these off-gases also contain less than 20% carbon dioxide, they can be directed to the dense phase membrane unit operation otherwise these residual off-gases should be directed to the absorption tower within the toxic emission containment train.

The last unit operation in the toxic emission containment train is the membrane configuration using dense phase or coupled transport membrane materials to separate and clean carbon dioxide and oxygen present, although some inert gases, will be recycled. Trace quantities of the halogen and noble gases, if present, will be included in this permeate stream. Potentially toxic emissions with a molecular weight greater than 40 will be recycled in the rotary kiln. Should the off gases directed to the dense phase membrane configuration, with a molecular weight greater than 40, contain valuable byproducts in addition to the potentially toxic emissions, this process stream can be directed to a byproduct recovery system for further treatment. The remaining off-gas constituents will have a molecular weight between 15 to 40. The primary substance will normally be nitrogen and it should adhere to industrial grade specifications. Should contaminates be present, special purpose dense phase or coupled transport membrane stages can be added to separate and recycle the contaminates. The utilization of other chemical treatment technologies to provide byproducts in this molecular weight range is within the scope of this invention.

The preferred process chemically and/or thermally treats substances containing solids and toxic constituents or substances containing solids and generating toxic constituents during processing. The subject toxic constituents and acceptable emission limits are specified by litigation, regulations, and guidelines issued by local, state and/or the federal government. The subject process will render these toxic constituents inert as specified by the above named limits and/or will prohibit the release of unacceptable toxic emissions.

The basic process focuses on containment of toxic emissions while producing useful byproducts. Optional unit operations are included to provide solid, liquid and gaseous byproducts while maintaining containment of toxic emissions and other unwanted contaminants. Thus the preferred process includes the steps listed hereinafter.

(a). The feedstock is initially and precisely fed into a rotary kiln operating at temperatures between 250 degrees F. to 1800 degrees F. to volatilize water, inorganic and organic substances but remain at least 50 degrees below the lowest eutectic point of a solid constituent with a composition greater than 4% of the total solid loading.

(b). A unique multi-purpose manifold device to introduce all ingredients, other than solid feedstock into the rotary kiln (e.g., fuel, oxidant, water, liquid/gaseous feedstocks, flue gases, sorbents, admixtures, etc.).

(c). An optional cyclone(s) may be placed between the rotary kiln and the Air Pollution Control System (APCS) to remove solid particles conveyed from the kiln with the off-gases. If these captured solid particles contain toxic substances, they should be directed to the solid thermal treatment (vitrifying/melting) reactor. The optional cyclone (s) must operate within a temperature range between 250 degrees F. and 1800 degrees F. and a pressure differential range between 1-in. to 8-in. w.c.

(d). A vitrifying solid thermal treatment reactor, receiving solids directly from the kiln, capable of operating in a temperature range between 250 degrees F. to 3000 degrees F. bath temperature, normally operating between a 1600 degrees F. to 2800 degrees F. bath temperature. The actual temperature used will vary with feedstock composition and the selection of admixtures. The primary objective is to achieve a minimal amount of homogeneity required to achieve the desired degree of solidification, to satisfy regulations, to lower the viscosity, to allow product stratification by differences in density, and/or volatilize specific products for separation and recovery as a byproduct. Volatilized products will be recovered in a condenser. The condenser off-gases will be directed to the gaseous thermal treatment reactor, the APCS, or the appropriate location in the toxic emission containment train. Molten products will be removed by side and bottom taps in the appropriate locations. The molten products will be collected in the appropriate mold (solid or granular). The off-gases will be directed to the gaseous thermal treatment reactor, the APCS or the appropriate location in the toxic containment train.

(e). A gaseous thermal treatment reactor, receives off-gases from either or both the rotary kiln and the solid vitrifying thermal treatment reactor in addition to gaseous feedstocks, recyclable substances, and off-gases from byproduct recovery units. The reactor typically operates in the 1400 degrees F. to 2800 degrees F. temperature range with at least 1% oxygen in the off-gases and with a thermal treatment period between 1 second to 5 seconds resident time.

(f). An Air Pollution Control System (APCS) receives gases from the gaseous thermal treatment reactor, byproducts recovery units and water from the toxic emission containment system. The influent gas temperatures will be in the 1400 degrees F. to 2800 degrees F. temperature range and are cooled to less than 200 degrees F. The required cooling may be accomplished by directly inserting cold water or cold air, or by a air-gas heat exchanger or a waste heat boiler. The system is designed and sized to achieve typical effluent conditions: less than 0.04 grains/dscf of particulate matter; less than 250 ppm acid gases of a effluent temperature between 150 degrees F. to 200 degrees F.

(g). The influent to the toxic emission containment train is the APCS and the byproduct recovery gaseous effluents. The toxic emission containment train is normally comprised of three unit operations in series: subcooling, absorption, and membrane separation. The critical unit of operation is the containment of gaseous toxic emissions is the dense phase of coupled transport (gas-gas separation) membrane separation stages. The subcooling and absorption units represent optional complementary separation stages to be used to reduce the deleterious effects on the membranes should excessive quantities of acid gases, metals, organics, and particulate matter be present and to provide a dampening effect during transient operating conditions. Also subcooling and absorption unit operations are frequently an integral part of byproduct recovery.

(i). Subcooling is the preferred method to remove water vapor from the gaseous influent; although water vapor is readily cleansed with dense phase membrane technology. Normally, the APCS gaseous effluents are saturated at a nominal temperature of 180 degrees F. For each 20 degree F. drop in temperature, the remaining water content in the gases will be reduced about 50%. The preferred amount of subcooling is to decrease the gas temperature below 100 degrees F. Subcooling will also remove a fraction of the particulate matter, acid gases, organics and metals present The quantities removed are dependent upon the amount of water present to enhance the removal process and the final gas temperature. The preferred method of operation is to directly recycle this dirty water stream to the APCS without cleaning. If there is a continued increase in the concentration of toxic emissions in the condensate, porous membranes used for solid-liquid, liquid-liquid and liquid-gas separation, is the preferred method of cleaning, with the retentate directed to the second stage solids vitrifying reactor after being blended with admixtures. The permeate, the clean water, can be recycled or discharged to a natural conveyance. The utilization of other types of solid-liquid, liquid-liquid, liquid-gas separation technologies in lieu of or in conjunction with membrane technologies is within the scope of this invention.

(ii). Absorption with an inorganic absorbent is the preferred method for removing carbon dioxide, although carbon dioxide is readily cleaned with dense phase membrane technology. Organic absorbents can be used to remove carbon dioxide as well as inorganic absorbents; however, these absorbents mask organic toxic emissions or other organic unwanted contaminants when they are present. Organic absorbents may be utilized when organic toxic emissions or organic contaminants are not present or if membrane configurations are used to cleanse the effluent from the carbon dioxide regeneration effluent. Normally, carbon dioxide and nitrogen will be the main constituents remaining in the subcooler effluent. The preferred method for cleaning carbon dioxide, to within industrial grade specifications, while containing toxic emissions is to use two phase changes (gas to liquid, liquid to gas). The first phase change (gas to liquid) separates the nitrogen from the carbon dioxide. The second phase (liquid to gas) is conducted in three stages to ensure containment of toxic emission and to produce an industrial grade byproduct. Carbon dioxide is classified as an acid gas. The inorganic absorbent will also remove the remaining acid gases, a fraction of the remaining metals, organics and particulate. The first stage of the two stage carbon dioxide phase change regenerator configuration is to increase the absorbent temperature to within 10 degrees F. of the carbon dioxide boiling point in the stripping column. This action will remove any semi-volatile organic substances. These residuals will be recycled. The absorbent leaving the stripping column will enter the regenerating column where the carbon dioxide will be regasified. The carbon dioxide effluent will pass through a dense phase membrane before being transferred to holding tanks for sampling and analysis prior to release or recycle. The dense phase membrane retentate will he recycled to the thermal reactor. Either periodic or continuous cleaning or purging of the absorbent may he used to remove foreign ingredients from the absorbent. Porous membrane technology is preferred with the retentate directed to the solid thermal treatment reactor if toxic substances are present.

(iii). A multiple stage membrane configuration is required to process the gaseous effluent from the absorber and any byproduct recovery units incorporated into the process configuration. An optional sub-cooler between the absorber and the multiple stage membrane configuration is within the scope of this invention. It serves the same function as the initial sub-cooler in section (i). These gases will be saturated; however, the mass flow is significantly reduced and the gases are cleaner. If the sub-cooler is utilized, cleaning should not be required unless discharge is to a natural conveyance. A minimization of two membrane stages are required to produce an industrial grade nitrogen commodity. The retentate will have a molecular weight greater than 40. The permeate from the second stage is residual water vapor, hydrogen, carbon dioxide, oxygen, halogen and noble gases, all in minute quantities. For expediency, these gases are recycled to one of the thermal reactors although no toxic substances are expected to be present. The permeate from the first stage is the feedstock to the second stage. The second stage retentate contains the industrial grade nitrogen and represents the major fraction of the effluent to the membrane unit operation. Additional membrane stages will be required to remove foreign constituents from the nitrogen commodity stream or to recover additional gaseous byproducts. For either situation, the utilization of other liquid-gas, gas-gas separation technologies in conjunction with the aforementioned membrane stages is within the scope of this invention.

Therefore, it is a broad object of this invention to provide a system for thermally treating, processing and volumetrically reducing various selected feedstocks to prepare them for disposal or beneficial reuse, by transformation of them to a chemically stable ashen or vitrified form and producing commercially valuable solid, liquid and/or gaseous byproducts.

A similar broad object is to provide a process for disposing of hazardous materials such as municipal solid wastes, low level radioactive wastes, transuranic wastes, intermediate level radioactive wastes, hospital wastes, laboratory wastes, pharmaceutical wastes, oils containing radioactive particles, radiological wastes, asbestos, soils, and any other radioactive or non-radioactive wastes or mineral products.

Another object is to dispose of radioactive wastes mixed with other wastes such as toxic wastes, hazardous wastes, medical wastes, pharmaceutical wastes, or toxic and hazardous wastes or materials including soils, sludges, and "mixed" wastes.

A related object is to provide a system of the character described that will detoxify organic materials.

It is also an object of the present invention to provide a thermal treatment or roasting or calcining of feedstocks containing municipal solid waste, toxic or hazardous waste, or radioactive wastes or sludges, soils, or minerals.

Another object is to provide a means whereby the feedstocks may be transitioned between ashen and molten modes in the rotary kiln primary combustion chamber.

Still another object is to provide such a means whereby both ashen and molten modes may be simultaneously obtained in selected portions of a rotary kiln combustion chamber.

A similar object is to dissipate or melt away donut ring buildup that can interfere with rotary kiln operation.

Yet another object is to provide a zonal, multiple-purpose burner manifold means that dissipates material buildup within the rotary kiln combustion chamber that would otherwise form objectionable "donut ring" build-up.

Another object of the present invention is to provide a plurality of independently-operable, longitudinally-successive treatment zones in which operating parameters may be independently controlled.

Another object is to provide a rotary kiln system in which a plurality of burners in groups or zones having the capability of variable flame geometry, temperature, intensity, and velocity, project flames directly upon the tumbling bed or pool of feedstocks being thermally treated or in virtually any direction within the kiln.

Another object of the present invention is to provide a multi-purpose plenum comprising a plurality of aperture tips that may be selectively disconnected or replaced for maintenance or to alter the flame geometry, intensity, temperature, and chemical composition.

Still another object is to provide a cooling jacket and cooling media to ensure the structural integrity of the free-spanning multiple purpose plenum.

Yet another object is to provide an enhanced system for the evacuation of gas generated within the primary combustion chamber of a rotary kiln. It is a feature of my invention that at least one outlet is provided at each end of the primary combustion chamber of the kiln, such that the gas may be evacuated in a path either coincident with or opposite to the direction of travel of the feedstocks being treated.

Another object is to independently dynamically control a plurality of electrical/gaseous plasma torches or other special heat sources to enhance the thermodynamics of a rotary kiln system of the character described and which is provided with mechanisms to introduce the desired admixtures.

A further object of this invention is to utilize the rotary kiln to chemically treat feedstocks above 250 degrees F. without emitting toxic emissions to the environment.

Still another object is to provide a system to inject air, fuel, oxidants, or other fluids, gases, and powders or any combination thereof, including recycled fluegases and components, tangentially or in any other desired direction into the tumbling bed of feedstocks to impinge or contact material directly, in longitudinally-successive zones, within the primary combustion chamber of the rotary kiln.

A further object is to induce a toroidal, swirling flow of gases to enhance the desired chemical reactions, prior to exiting the primary combustion chamber of the rotary kiln, and to reduce the particulate carryover to the air pollution control system.

Another basic object is to provide a treatment process for treating radioactive wastes mixed with other wastes such as toxic wastes, hazardous wastes, medical wastes, pharmaceutical wastes, or toxic and hazardous wastes or materials including soils, sludges, and "mixed" wastes to form a stable, nonleaching vitrified end product and commercially valuable gaseous byproducts.

A related object is to provide a process of the character described that will detoxify organic materials while producing stable end products that may safely be disposed of in accordance with applicable state and federal guidelines.

Another object of the present invention is to provide a process wherein a rotary kiln is coupled with a vitrifier and a thermal gas reactor in series.

A related object of the present invention is to provide a process wherein a reactor configuration is coupled with a conventional APCS and a toxic emission containment train to prevent the emission of toxins to the environment.

Another object is to provide a process wherein commercially valuable byproducts from thermal treatment reactors can be separated from potential toxins, held and tested before being released from the process to the environment.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary pictorial view of the first and second reactor in the reactor configuration, with the first reactor incorporating an advanced cyclonic rotary kiln construction and the second reactor incorporating a gravity fed vitrifier in accordance with the best mode of the present invention, with portions thereof broken away or shown in section for clarity;

DETAILED DESCRIPTION OF THE BEST MODE

A treatment process cooperatively combines a novel reactor configuration and a gas treatment system to chemically treat toxic substances to produce a stable, nonleaching solid product and acceptably safe, solid, liquid and/or gaseous byproducts. During pyrolytic, substoichometric or calcining operations, other inert gaseous liquid and solid byproducts can be separated, cleaned and stored in a similar manner, if desired.

1. Preferred Reactor System

Preferably, the reactor configuration comprises three reactors that thermally treat the feedstock while containing all toxic emissions. The process uses a complex toxic emission containment train downstream of a conventional APCS to separate, cleanse and recycle residual, potentially toxic emissions back into the most appropriate thermal treatment reactor.

The purpose of the simultaneous use of two solid/liquid reactors and an optional gas thermal treatment reactor is to improve the stability and quality of end products and to provide a receptacle where recycled materials are subjected to further treatment.

Figure 1A:
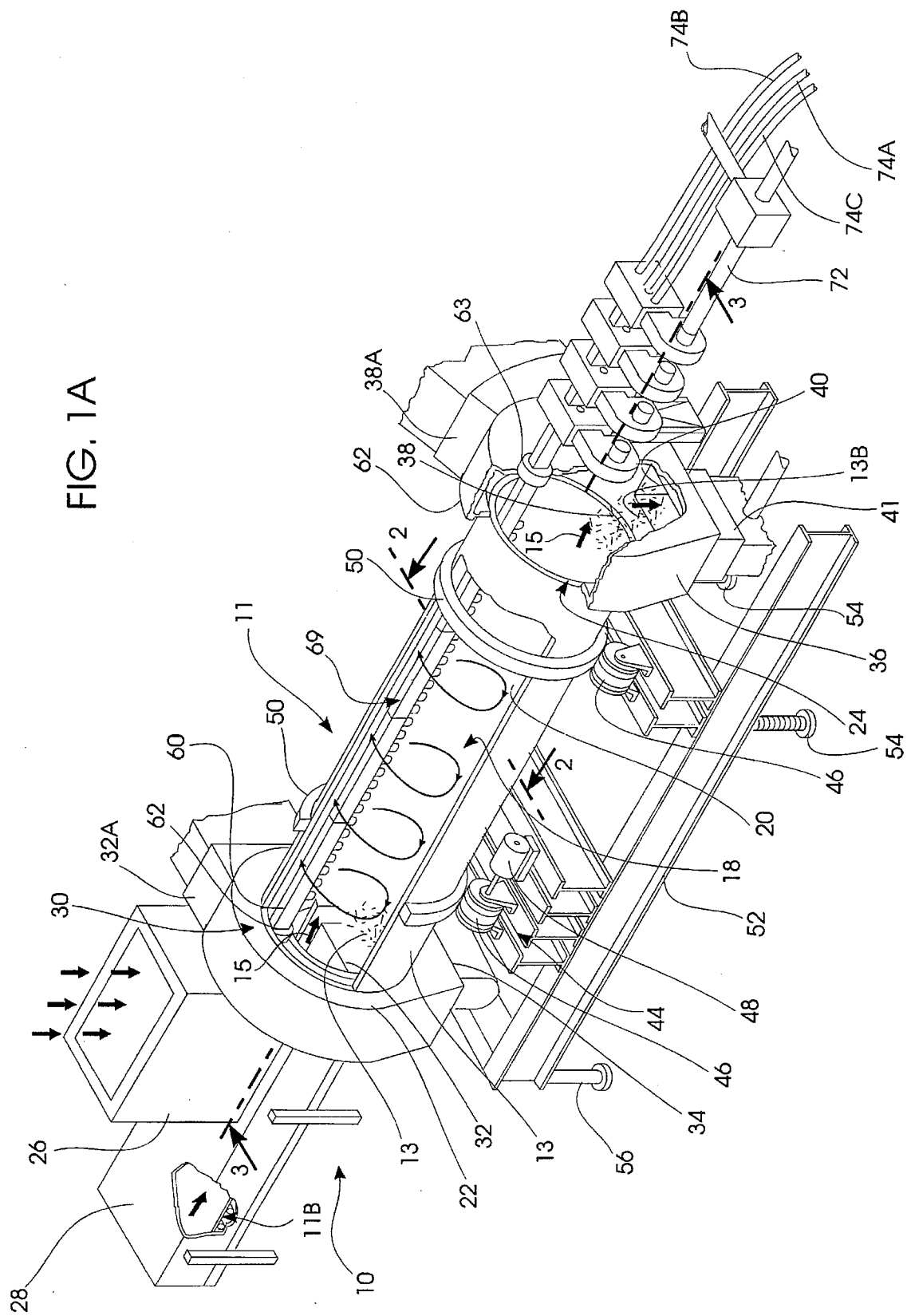
FIG. 1A is an enlarged, fragmentary, pictorial view of the rotary kiln of FIG. 1, with portions thereof shown in section or broken away for clarity.

An advanced, cyclonic, rotary kiln thermal treatment system 10 incorporating various features of the present invention is illustrated in FIG. 1. The rotary kiln is generally designated by the reference numeral 11. Kiln 11 is designed for chemically and/or thermally processing, treating, and volumetrically reducing selected feedstocks for permanent burial or other disposal, or conversion to other products having beneficial reuse value. Material to be treated moves in the direction indicated by arrows 15 (FIG. 1a).

Contaminated feedstocks, which may contain toxic or potentially toxic substances, typically comprise low or intermediate level radioactive wastes, transuranic wastes, hospital wastes, laboratory wastes including expired test animals, pharmaceutical wastes, oils containing radioactive particles, radiological wastes, asbestos, and any other wastes containing a radioactive constituent. Intermediate level, transuranic, or low level radioactive wastes or toxic/hazardous wastes or mixed wastes may include consumable products such as protective clothing, protective packaging, cleaning tools such as brooms and mops, wooden pallets and metallic waste containers; soils; slurries and sludges such as those obtained from excavated ponds and lagoons; and bead and powdered resins. Though many types of hazardous wastes are mentioned, it will be understood that my system may be used to thermally process a wide variety of other feedstocks which contain or generate potentially toxic emissions or undesirable contaminates during treatment.

In the best mode kiln 11 stabilizes and encapsulates the radioactive or toxic or otherwise hazardous constituents and thermally destructs any hazardous organic constituents while volumetrically reducing the waste. The process outputs a glass-like vitrified end product that encapsulates and stabilizes constituents that would otherwise leach into surrounding soil and ground water, such as organic or inorganic materials including heavy metals. In an alternative embodiment, the process outputs a glass-like product and a metal product that may be beneficially recycled or reused and an optional third stream of slag-like material.

FIG. 1 illustrates a typical system 10 in which the kiln 11 of the present invention may be incorporated. The elongated generally tubular kiln 11 defines an internal, generally cylindrical combustion chamber 18 bounded by a substantially cylindrical wall 20 opened at its opposite ends 22, 24. Preferably, wastes 12 (FIG. 1) are transmitted via conveyor 11B to kiln 11 through a shredder/feeder 26 that blends and homogenizes the incoming wastes and admixtures 12A to form feedstocks 13. The feedstocks 13 may also be introduced into the kiln 11 via a ram-type feeder (not shown) or introduced unopened via a chute feeding mechanism (not shown).

Waste container 14 (FIG. 1) is typically a barrel which may be placed into the shredder/feeder 26 along with the wastes 12. The shredder/feeder 26 serves to grind, homogenize and reduce the size of the wastes 12 and container 14 to a size small enough to be introduced into, homogenized, and processed within the kiln 11. The shredder/feeder 26 may work in conjunction with a conveyor system such as the conveyor system 28 to introduce the resulting feedstocks 13 into the kiln 11, the ram feeder, or the chute. To output the desired "glass-like" or "ceramic-like" end product when operating in a molten or vitrifying mode, rather than in an ashing mode, an admixture 12A of materials such as sandy soils, silica-type materials, glass, shale, iron-enriched basalt, or the like, is combined in the combustion chamber 18 or the vitrifier 42 along with the wastes 12 to form feedstocks 13. The wastes 12 and optional admixtures 12A forming feedstocks 13 are thermally processed and thermally treated together in an ashen or slagging or molten mode, yielding an end product in the form of glass or ceramic frit which stabilizes and encapsulates otherwise leachable constituents and radionuclides, thus preventing the same from leaching into the soil and ground water and providing a superior form for final burial or beneficial reuse. End products 16 eventually leave the vitrifier 42 and are held in storage for testing before being released from the system into the environment. Normally, the final waste product 16A is in a vitrified form unless an ashing mode of operation is selected. In a contemplated optional embodiment, the vitrifier may also produce potentially useful metal products 16B and a slag-like product 16C.

The rotary kiln is supported at either end 22, 24 by an entrance chamber or breeching 30 and a circumscribing exit chamber or breeching 36. The kiln rotatably enters both the entrance and exit chambers 30, 36 so that rotation of the kiln about its longitudinal axis is accomplished. The openings 32, 38 defined by the entrance and exit chambers or breechings 30,36, respectively, for receiving the first and second ends 22, 24 of the rotating kiln, respectively, are sealed to prevent unselected fluid communication between the entrance and exit chambers 30, 36 and the surrounding environment, and to prevent the leakage of air into and out of the chambers 30,36.

A rotation imparting means 44 (FIG. 1A) rotates the kiln about its longitudinal axis. As shown, the preferred embodiment includes a plurality of pairs of trunnion wheels 46 secured to a support frame 52, one of each of the pairs of wheels 46 being disposed on either side of the combustion chamber 18 and registering with the spaced apart rotation rings 50 circumscribing the kiln. The wheels 46 support and rotate the kiln to revolve the combustion chamber 18. One or more of the wheels 46 is driven by a conventional motor 48.

The rotational speed of the kiln may be selectively variable. To this end, the motor 48 provided for driving one or more of the wheels 46 may be a variable speed type, thereby allowing for the variation in speed during operation of the rotary kiln system 10. It will be understood that other types and configurations of rotation imparting means 44 may be incorporated as required. For example, it is envisioned that the thermal treatment chamber 18 rotated by a girth gear system (not shown) around the rotary kiln 11 outer periphery similar to that used in drum mixers and the like. Therefore, it is not intended to limit the present invention to that rotation imparting means 44 described in depicted in the figures.

To enhance the flow of material from the entrance chamber 30 to the exit chamber 36, the combustion chamber 18 of the preferred embodiment is positioned such that the exit chamber 36 is at a lower elevation than the entrance chamber 30. The height of the respective ends 22, 24 of the thermal treatment chamber 18 angle of repose may be selectively adjusted by a plurality of adjustable leg members 54 and nonadjustable leg members 56. The adjustable leg members 54 may be any conventional type and may be positioned at lower end of the support frame 52. Non-adjustable leg members 56 are positioned at either or both ends of the other end. The adjustable leg members 54 may be selectively operated in order to vary the angle of repose of the thermal treatment chamber 18 in order to vary the time of travel of the feedstocks 13 within the combustion chamber 18, commonly known as retention time as well as bed/pool depth of the feedstock being processed in the kiln.

A multiple purpose manifold 69 (FIGS. 3–4), which may alternatively be operated as a staged injection system for multiple admixtures, is carried within the thermal treatment chamber 18 and is pivotally secured at ends 60, 61 by couplers 62, 63 attached to the front and rear breeching chambers 30, 36. The multiple purpose manifold 69 delivers admixtures to treat, process, and volumetrically reduce the feedstocks 13. The multiple purpose manifold 69 comprises companion compartments 69A, 69B (FIG. 6), each of which carries a plurality of apertures 66 disposed within reduced diameter necks 71A, 71B. Each neck defines a tip 68 that directs a flame, a spray pattern 64 toward the feedstocks 13 or at any selected angle thereto. The aperture tips 68 are screwed on or conventionally attached by any other method commonly used. Ideally, they are easily removable to facilitate service and adjustment to meet varying operating conditions and demands.

Figure 6:
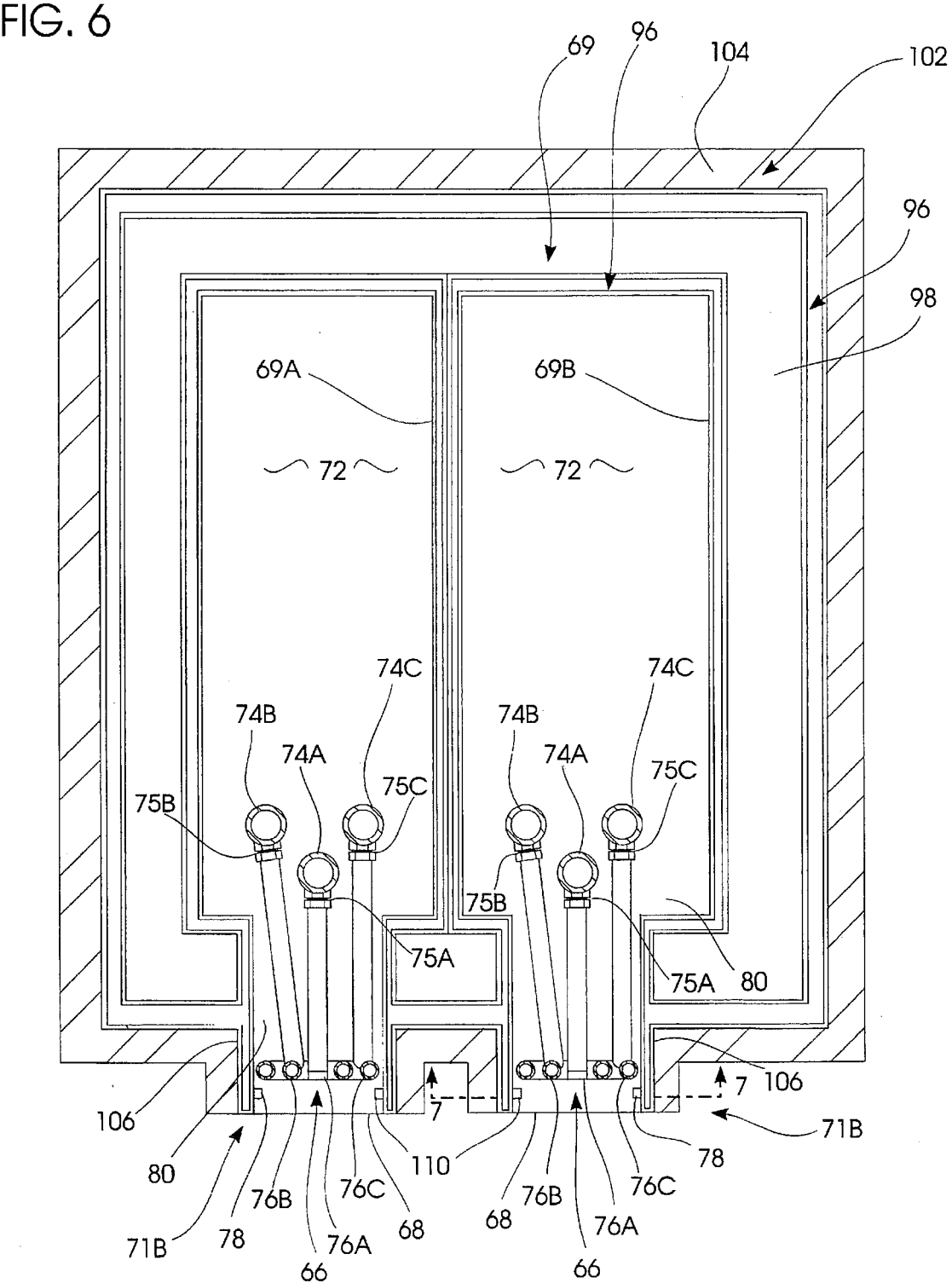
FIG. 6 is an enlarged sectional view of the multiple purpose burner and plenum device taken generally along line 6—6 of FIG. 4; and, FIG. 7 is a greatly enlarged fragmentary sectional view of a typical burner taken generally along line 7—7 of FIG. 6, with portions omitted for brevity.
Figure 7:
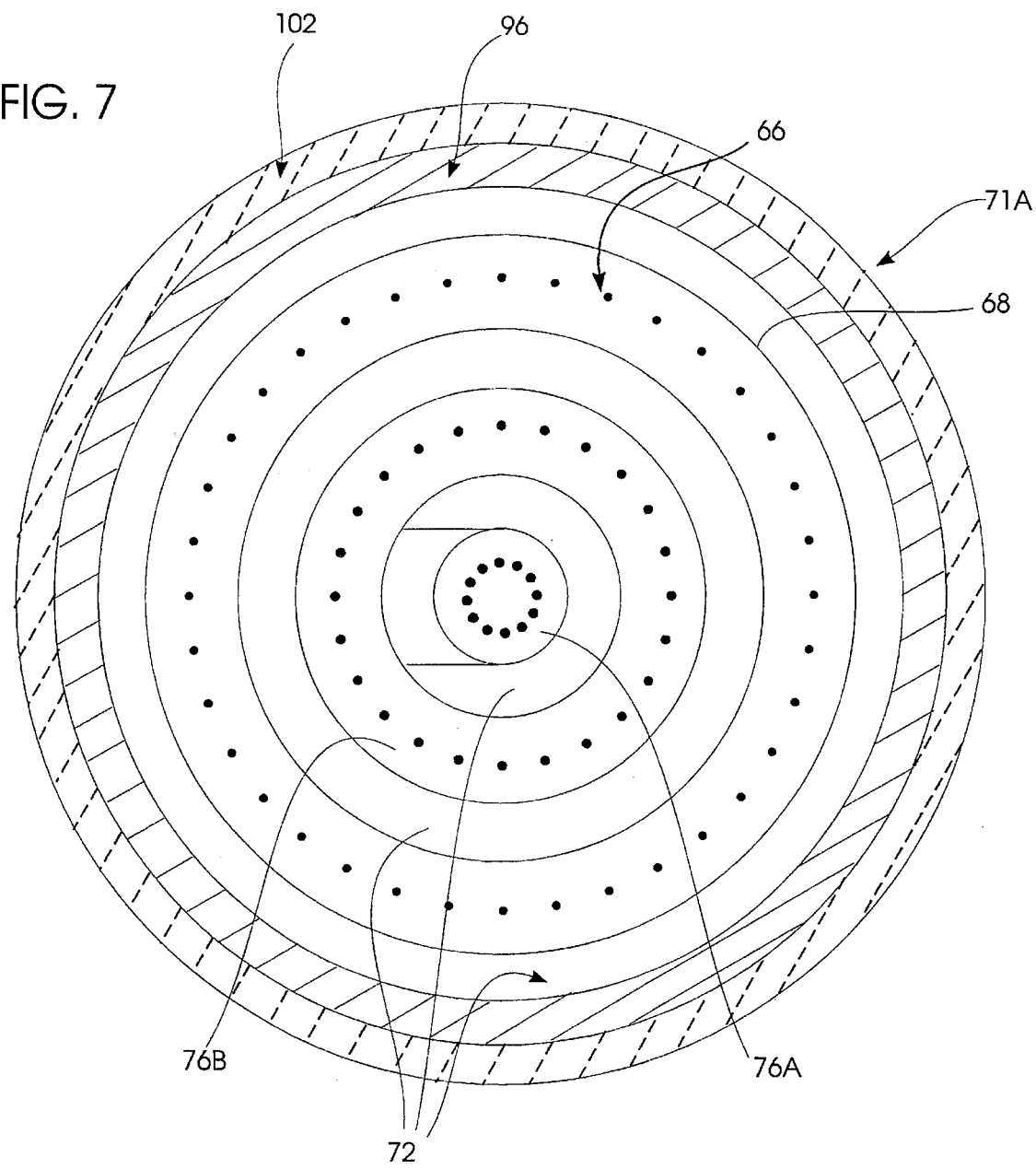

Each aperture 66 is supplied with fuel, oxidant and other admixtures by delivery lines 74A–C. Aperture tip 68 defines radially spaced apart, supply rings 76A–C that supply the different components to the aperture tip (FIG. 7). The supplied components may be interchanged at junctures 75A–C to adjust the output of the aperture tip to meet specified operating parameters. In other words, the desired component may be supplied by delivery line 74A to 76A or by 74B to 76B or by 74C to 76C, the oxidant and other admixtures being similarly interchangeable (FIG. 6). The supply rate of the components is controlled by a conventional valve arrangement (not shown).

The admixtures supplied to the aperture tip may be any one or a combination of different components to enhance the treatment process. Although not exclusive, the list of commonly used auxiliary components includes catalysts, inhibiters, coolants, sorbents, air and recycled exhaust flue gases (via lines 135A, 135B), water, accelerants or inert gases.

The multiple purpose manifold 69 may be pivoted within the thermal treatment chamber 18 so that the flame or spray pattern 64 is propelled by the individual injection jets 66 are typically substantially tangential to the cylindrical wall 20, defining the thermal treatment chamber 18 to induce a helical-like flow pattern of the gases (FIGS. 2–2A) or pivoted to induce other selected flame or spray patterns.

Figure 2:
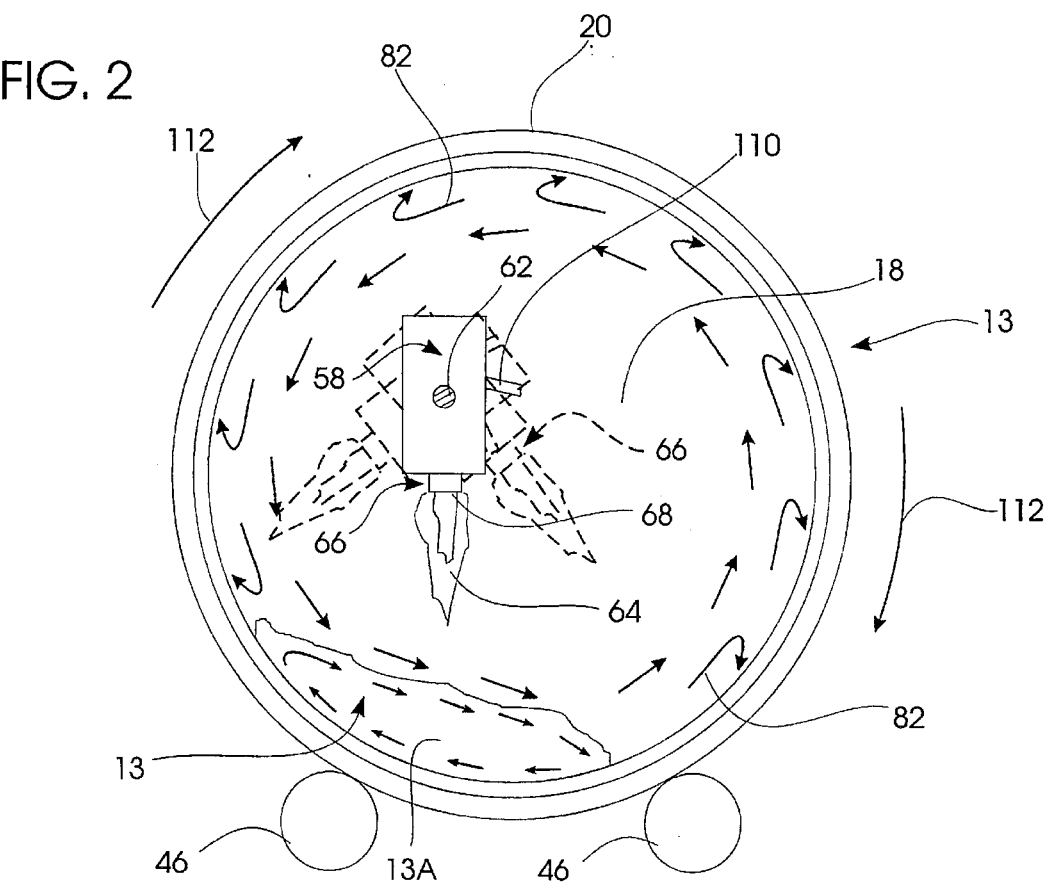
FIG. 2 is an enlarged, fragmentary sectional view of the preferred kiln taken generally along line 2—2 of FIG. 1A.

If the multiple purpose manifold 69 is positioned off center of the thermal treatment chamber 18, the direction of the flame or spray 64 is substantially tangential to the cylindrical wall 20, but variable. However, the desired flow pattern of the solid and gaseous products, including plasma states, within the thermal treatment chamber 18 is toroidal. Therefore, it is desired that the flame or spray 64 be directed toward the cylindrical wall 20 in a substantially tangential direction, which may be accomplished in a variety of ways. As depicted in FIG. 2, one such way is to position the multiple purpose manifold 69 within the thermal treatment chamber 18 a distance away from the center thereof at a position above the feedstocks 13 and the tumbling bed 13A. In this embodiment the flame or spray pattern, 64 are projected normally away from the multiple purpose manifold 69. It will be seen that the direction of rotation of the thermal treatment chamber 18, as noted by arrow 112, is countercurrent to the direction of flow of the gaseous matter and particulate matter entrained within the gaseous matter, as depicted by arrows 82 (FIGS. 1–2). The angle of flame or spray pattern, 64 relative to the bed 13A may be adjusted or fine tuned by pivoting multi-purpose manifold 69 about couplings 61, 63.

Figure 2A:
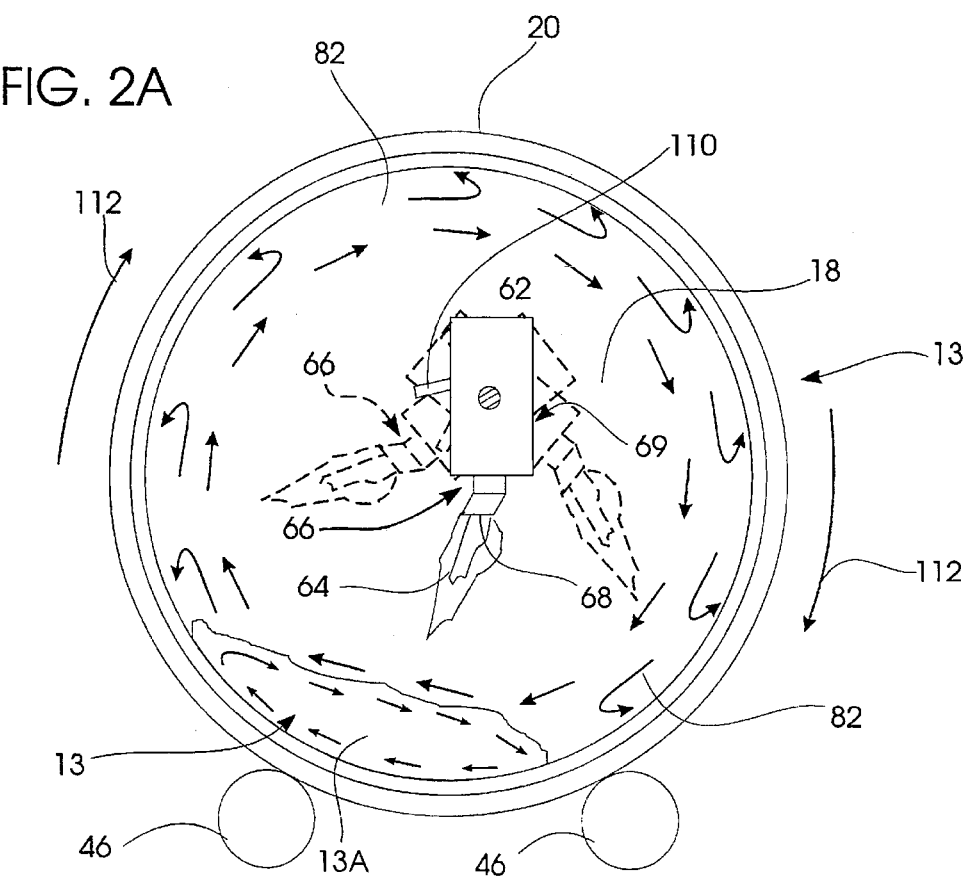
FIG. 2A is a view similar to FIG. 2, showing an alternative embodiment of my rotary kiln.

FIG. 2A illustrates an alternative position of the burner manifold 69. In that embodiment, the multiple purpose manifold 69 is positioned away from the tumbling bed 13A of feedstocks 13 and the flame or spray pattern, 64 are projected at an acute angle away from the burner manifold 69 and, as in the previous embodiment, toward the feedstocks 13. In each of the described embodiments, the multiple purpose manifold 69 is positioned such that the flame or spray pattern, 64 may be directed tangentially with respect to the cylindrical wall 20 of the thermal treatment chamber 18. It will be seen that, in the alternate embodiment of FIG. 2A, the direction of rotation of the thermal treatment chamber 18, as noted by arrow 112, is co-current with the direction of flow of the gaseous matter and particulate matter entrained within the gaseous matter, as depicted by arrows 82. The angle of the flame or spray pattern, 64 relative to the bed 13A may be adjusted or fine tuned by pivoting manifold 69 about couplings 61, 63

The thermal treatment and processing of the feedstocks 13 creates a gas effluent. Within the gas effluent is entrained particulate matter arising out of the feedstocks 13. The gas effluent is evacuated from the thermal treatment chamber 18 through either the upper entrance chamber expansible hood 32A or inlet breeching 30 or the lower exit chamber expansible hood 38A or outlet breeching 36 through the gas exhaust channel 86 or the gas exhaust channel 84, respectively. The direction of flow of gases passing through the exhaust channels 84, 86 is controlled by a Y-valve 114. Flow direction may be coincident with or opposite to flow of the feedstocks 13. When the Y-valve 114 is operated to allow flow through the gas exhaust channel 84, via the thermal treatment chamber discharge end 24, gas flow will be coincident to the flow of the feedstocks 13 traveling from the entrance chamber 30 towards the exit chamber 36. Conversely, when the Y-valve 114 is operated to allow flow through the gas exhaust channel 86 via the thermal treatment chamber first end 22, the gas flow will be opposite the flow of the feedstocks 13 within thermal treatment chamber 18. Gaseous effluent discharged through either of the gas exhaust channels 84, 86 is directed to the secondary thermal treatment chamber 120.

The gaseous exhaust may be cycled through any selected secondary thermal treatment chamber 120, also called a thermal gas reactor herein, and an optional air pollution control system 130. Portions of the gaseous effluent from the kiln may be recycled or reused in the multi-purpose manifold 69 or injection system. Of course, other downstream systems may be used as required. In the event that a secondary thermal treatment chamber 120 is incorporated, waste therefrom, such as ash, may be recycled through the kiln 11 feed system as depicted by line 140, until a final output of a glass-like or ceramic-like product is yielded and discharged from the rotary kiln 11 and vitrifier 42 (or also called a second solids reactor herein).

The helical flow pattern created by the tangential flame or spray pattern 64, significantly reduces particulate entrainment, or particulate carryover, typically exiting the thermal treatment chamber within the gas effluent. This is accomplished by centrifuging the particulate, as depicted by arrows 82, out of the gas/particulate stream within the thermal treatment chamber 18 and onto the thermal treatment chamber wall 20, or refractory periphery around the inner surface of the kiln wall 20, the wall 20 or refractory and coating being hot, sticky, and typically coated with viscous or molten material, thus capturing the entrained particulate from the exiting effluent being centrifuged and thereby substantially diminishing particulate carryover which is normally regarded as pollution. Particulate carryover is typically removed by a secondary thermal treatment chamber or thermal gas reactor 120, and an air pollution control system, scrubber, or other selected gas cleaning and separation systems, as hereinafter described.

The multiple purpose manifold 69 of the preferred embodiment may be operated at temperatures which yield operation in a slagging mode, an ashing mode, or both simultaneously within the rotary kiln primary thermal treatment chamber 18. The slagging mode is a mode at which the higher temperature flame characteristics which reduce the feedstocks 13 to a molten state. In the lower temperature ashing mode, the feedstocks 13 are thermally treated or burned to ash, typically below the ash fusion temperature, as opposed to being melted. In order to provide for the operation of the multiple purpose manifold 69 at temperatures whereby the rotary kiln primary thermal treatment chamber 18 may be operated in both the slagging and ashing modes simultaneously, a plurality of longitudinally successive treatment zones 70 are defined, each of which includes a plurality of apertures.

Figure 3:
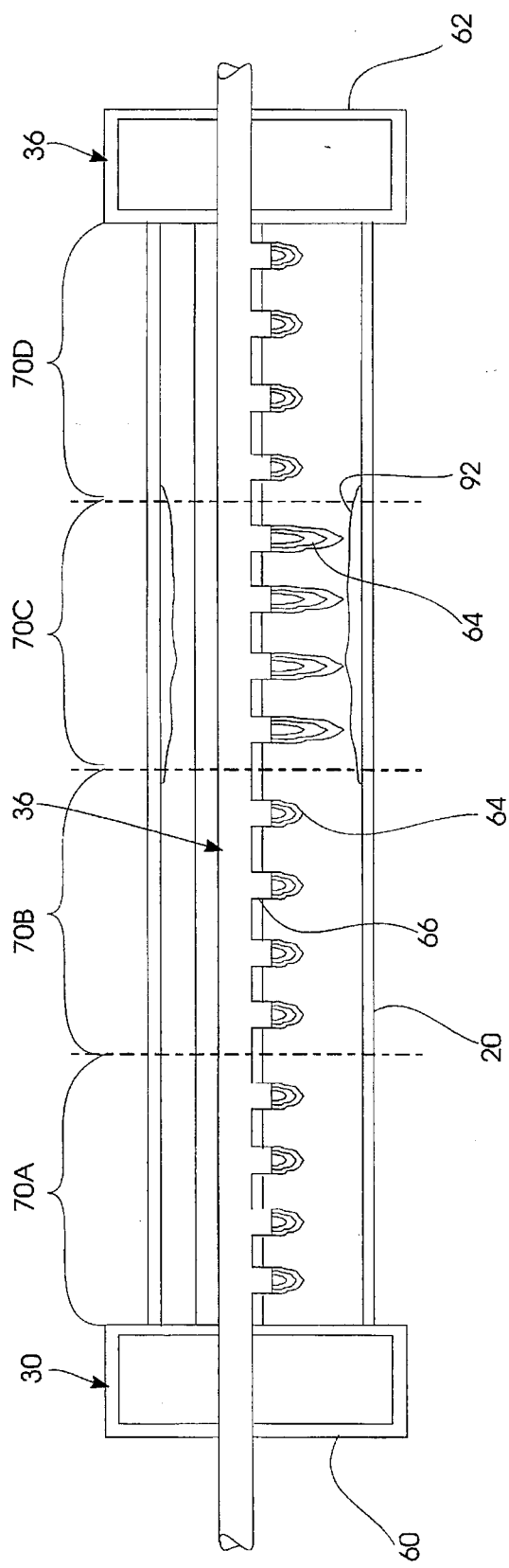
FIG. 3 is a fragmentary, longitudinal sectional view taken generally along line 3—3 of FIG. 1A.
Figure 3A:
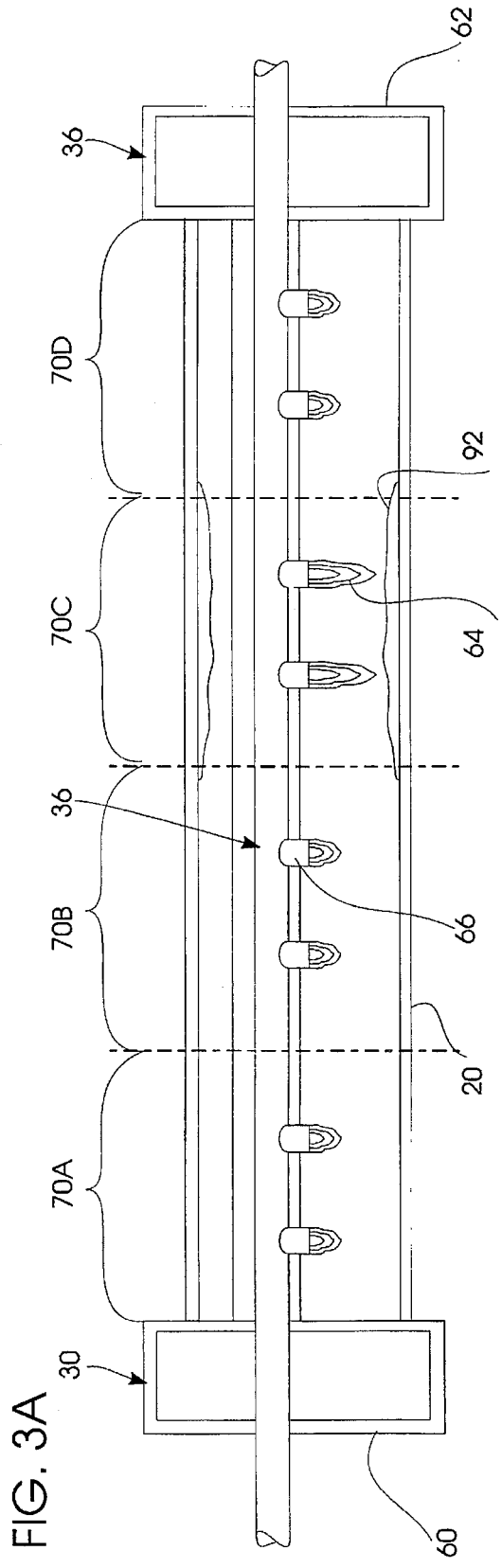
FIG. 3A is a view similar to FIG. 3, showing an alternative embodiment of my rotary kiln.
Figure 4:
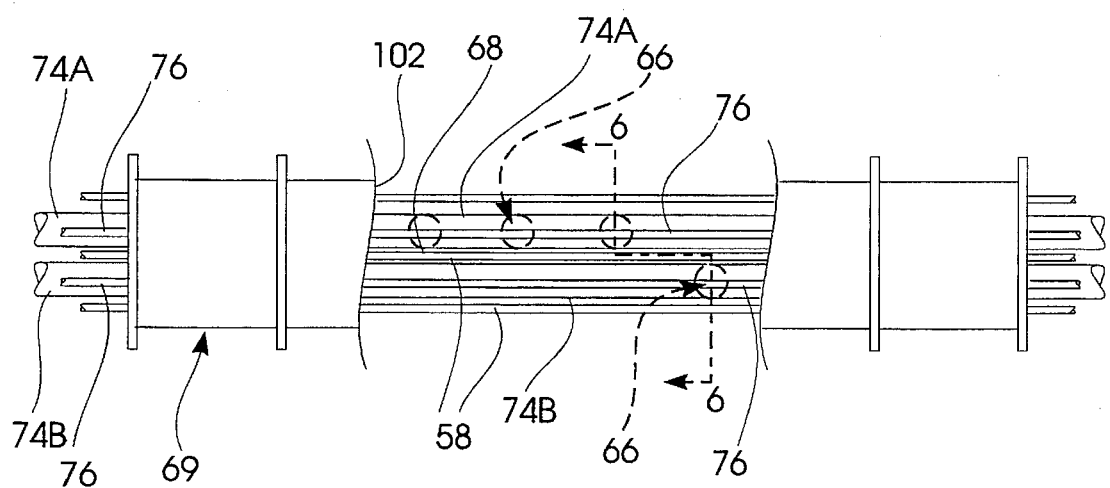
FIG. 4 is a fragmentary top plan view of the multiple purpose burner and plenum within the rotary kiln, with portions thereof shown in section for clarity or omitted for brevity.
Figure 5:
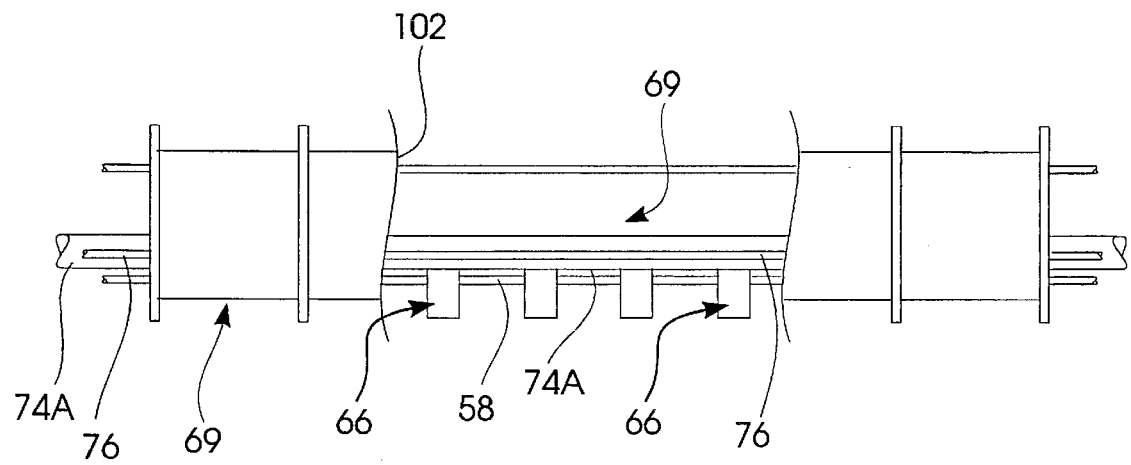
FIG. 5 is a fragmentary side elevational view of the multiple purpose burner and plenum within the rotary kiln, with portions thereof shown in section for clarity or omitted for brevity.

As shown in FIG. 3, four independently operable treatment zones 70A, 70B, 70C, and 70D are defined within the rotary kiln primary thermal treatment chamber 18. Each zone in turn comprises a plurality of longitudinally aligned, successive, commonly operable apertures 66 or a zonal injection system or multipurpose manifold. Thus, the first two zones 70A,B may be operated at temperatures yielding an ashing mode while the last two zones 70C,D may be operated at temperatures yielding a slagging mode. Alternatively, the zones 70A–70D may be operated at temperatures yielding only an ashing mode within the rotary kiln primary thermal treatment chamber 18. Of course, there are several different combinations of operating temperatures possible for the zones. Any other selected arrangement and thermal characteristics may be selected as desired.

The plurality of longitudinally successive and independently operable treatment zones 70 serves to precisely control the gas effluent characteristics and temperature profile throughout the thermal treatment chamber 18. The control of the temperature profile serves to reduce slag or waste buildup on the interior surface of the thermal treatment chamber 18. Operators of rotary kilns 11, thermal treatment and/or reduction, incineration and thermal treatment systems frequently encounter buildup of material in a transition zone between an ashing zone and a slagging zone. As shown in FIG. 3, the buildup of the waste material typically forms in the shape of a donut ring 92 around the thermal treatment chamber 18 interior and can damage any refractory-type insulation, as well as prevent the flow of feedstocks 13 from the first upper end 22 to the discharge, lower end 24 of the rotary kiln primary thermal treatment chamber 18.

In the preferred embodiment the operator can increase the temperature in the particular treatment zone 70 by selectively controlling the series of commonly operable burners 66 within that zone 70 where buildup 92 occurs. By increasing the temperature, the buildup 92 may be melted, rendered viscous, dissipated or longitudinally moved and eventually discharged.

The temperatures of the individual treatment zones 70 are variable and controllable due to the variability of the flame temperature, velocity, and geometry by zone or group or by variability of the oxidant when operating in that mode. Each treatment zone 70 is provided with a separately operable blower 72, a fuel delivery system 74A, and an oxygen delivery system 74B and an admixture delivery system 74C. The fuel, the oxidant, and the admixture components are combined at the aperture tips 76A–C and projected toward an ignition source 78 to create the selected flame or spray pattern 64. The flame or spray pattern characteristics, in any zone, may be controlled by increasing or decreasing any or all of these components, thereby varying the ratios of oxidants, fuel and admixtures. The component delivery lines 74A–C may be switched among all of the aperture tips 76A–C as at coupling 63. The individual lines 74A–C attached to individual aperture tips 76A–C may also be switched individually at junctures 75A–C as hereinbefore described.

The capability of variation of the flame or spray pattern characteristics, includes geometry, temperature, intensity, and velocity and direction, further benefits the efficiency of the present advanced slagging, vitrifying, cyclonic rotary kiln thermal treatment system by varying the cyclonic velocity or helical swirl and pattern of the gaseous effluent and entrained particulates in the thermal treatment chamber 18 and, hence, the degrees of centrifugal force effects on the particulates entrained in the gas effluent still contained in combustion chamber 18. Particulate carryover in effluent gas stream may be lowered by manipulating these velocities and flame direction. For example certain fine feedstocks 13 will require higher centrifugal velocities while certain coarse feedstocks 13 will require lower centrifugal velocities in order to remove the entrained particulates from the gas effluent and therefore minimize the carryover of the entrained particles to the secondary combustion system or thermal gas reactor 120 air pollution control system 130, boiler, or other selected gas cleaning or air pollution control system.

By varying the flame or spray pattern velocities, the ability to stir or impinge upon the bed or pool of feedstocks 13 will be affected. The stirring of the feedstocks 13 affects the chemical reactions of the feedstocks 13 and thus the efficiency of the kiln 11. By stirring and impinging the feedstocks 13, greater turbulence within the feedstocks 13 will be achieved and therefore heat transfer will be increased. With an increase in the heat transfer, the required treatment time will be reduced. The thoroughness of destruction of toxic or hazardous constituents will also be accomplished, as well as the achievement of an end product having an improved vitrified stabilized form and having greater uniformity.

The multiple purpose manifold 69 carries a burner ignitor 78 for igniting one or a plurality of longitudinally successive burners 66 within a selected treatment zone 70A–70D. The burner ignitor 78 is typically an electric spark generation source and is protected and cooled by cooling air or combustion air or other fluid medium within the multi-purpose burner manifold 69 and at the area of the aperture tips 68. This type of burner ignition means 78 includes electrical wires fed to each spark igniter.

To protect the fuel, oxidant and auxiliary component delivery systems 74A–C the burner ignition wires are located within the multi-purpose burner manifold 69, and further to protect the strutural integrity of the multi-purpose burner manifold 69 from the adverse effects of intense heat, a hollow cooling jacket 96 fabricated from a heat resistant and chemical resistant alloy is provided to surround the burner manifold 69. An annular volume 98 is defined between the burner manifold 69 and the jacket 96, through which a containment gas or additional cooling medium may be passed The cooling jacket 96 comprises a hollow jacket that may contain a selected cooling medium for heat transfer. Typically, the cooling medium is heated by conduction of heat from the thermal treatment chamber 18 and is then continuously evacuated from the cooling jacket 96 by a selected device (not shown) such as a fan or pump. The selected cooling medium may be air, steam, water, nitrogen, or any other suitable gas or liquid that may be cooled and recycled.

A selected insulated shell 102 is provided to further protect the multiple purpose manifold 69 and the jacket 96. The shell 102 of the preferred embodiment is a castable or gunned plastic or concrete-type but light weight refractory mixed with titanium, nickel-chrome, or ceramic fibers 104, or the like. The shell 102 may be a monolithic pre-fired shape. The refractory material included in the insulated shell 102 of the preferred embodiment protects the multiple purpose manifold including the cooling jacket 69 from high temperatures attained within the thermal treatment chamber 18. Further, shell 102 is corrosion resistant and therefore protects the multiple purpose manifold 69 from chemical attack.

An anchor 106 is provided for maintaining the position of the insulated shell 102 relative to jacket 96 and the multiple purpose manifold 69. In the preferred embodiment, the anchoring means 106 includes a stud or VS-type anchoring system to secure the insulated shell 102 and refractory coating to the exterior surface or outer layer or of the cooling jacket 96 as shown. The fibers 104 mixed with the refractory material to comprise the insulated shell 102 also serve to anchor the insulation to the cooling jacket 96. The fibers 104 also serve to prevent abrasion and pulling off of the shell 102 as the particulate matter derived from the feedstocks 13 being thermally treated is entrained in the swirling gas effluent and collides with or impinges the shell 102 covering the cooling jacket 96 and most of the multiple purpose manifold 69.

A plurality of data collecting devices 110 may be carried and supported by the multiple purpose manifold 69 at selected locations in order to continuously and contemporaneously monitor the temperature and gas composition within the longitudinally successive treatment zones 70A, B,C,D of the thermal treatment chamber of the kiln 69. The data collecting devices 110 may include thermocouples, gas acquisition systems, or any other selected devices required for the specific purposes of the kiln 11, with the associated wiring and/or piping systems associated with such data collecting devices 110 (i.e., the wiring associated with the thermocouples and the piping system associated with the gas acquisition systems) being carried within and traversing the cooled inner core of the multiple purpose manifold 69. The data collecting devices 110 provide real-time data reflecting the thermal treatment processes and temperature profiles and combustion gas compositions within each successive treatment zone 70A,B,C,D of the rotary kiln primary thermal treatment chamber 18.

After being selectively thermally treated, processed, and or volumetrically reduced, solid and liquid feedstock residuals 13A, including ash, metals, or slags pass through an outlet chamber 40 through an expansible chute 41. Chamber 41 may contain additional heating mechanisms adjacent the exit chamber 36 before the residuals 13B pass into a vitrifier or solids reactor 42 and thence onto other appropriate receptacles for storage and/or transportation. The end products 16 are evacuated in a vitreous or glass-like form and are ready for disposal in a final, "cool" vitrified form.

In the preferred embodiment, the feedstocks residuals 13A are gravitationally feed directly into a conventional vitrifier/melter. If the vitrifier feed 13A is in an ashen state from the combustion chamber 18, the vitrifier will heat the feed and transform it into a molten liquid. Optional admixtures 12B may be added directly to the vitrifier. The vitrifier has at least two output streams for the separate recovery of metals, glass-like material and the slag material. Metal refining will require additional outlet taps. The utilization of admixtures will require a plurality of feed ports into reactor 42. Upon cooling, the metals may be recycled and reused. The slag material forms a stabilized, glass-like or ceramic-like brick suitable for burial or storage.

2. Preferred Process

Figure 8:
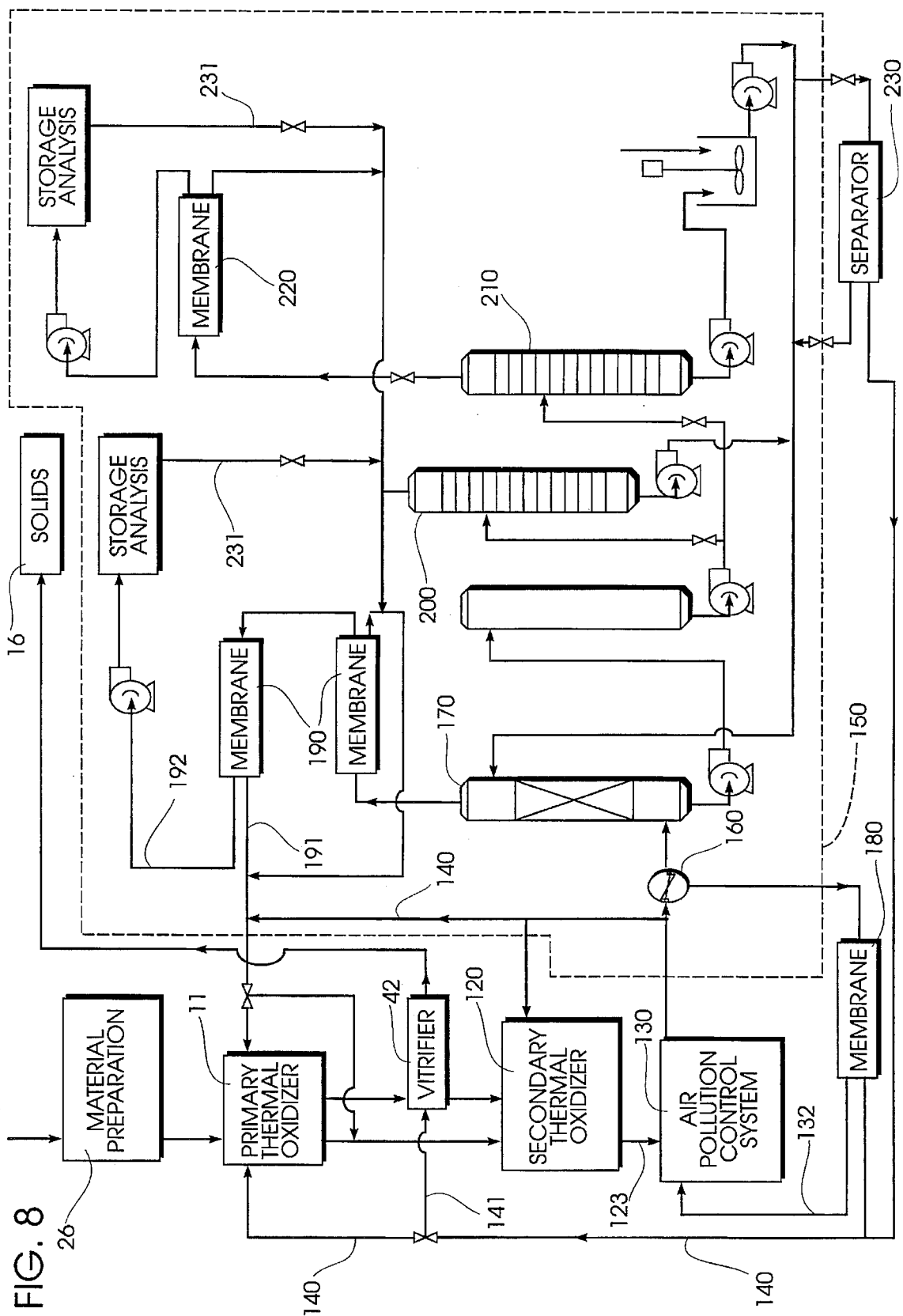
FIG. 8 is a flow diagram for the preferred treatment process.

A treatment process cooperatively combines the above novel reactor configuration 10 and a gas treatment system to chemically treat feedstocks containing or generating toxic substances and undesirable contaminates to produce a stable, nonleaching solid product and acceptably safe, solid, liquid and/or gaseous byproducts (FIG. 8). During pyrolytic, substoichometric or calcining operations, other inert gaseous liquid and solid byproducts can be separated, cleaned and stored in a similar manner, if desired.

The first reactor, the rotary kiln 11 introduces admixtures which will enhance the desired reactions or throughputs and separates the solids from the water and other organic substances which volatilize below the eutectic point of any solid substance present in the feedstock.

The second reactor, a vitrifier or melting reactor 42 extends the chemical/thermal treatment range above the minimum eutectic point of the solid contaminants leaving the rotary kiln while economically removing any water, inorganic and organic residuals from solids without eutectic points below 1800 degrees F. and where the solids are scheduled for further treatment at higher temperatures. When processing feedstocks which do not contain detrimental quantities of water and organic constituents, the rotary kiln may not be required. The second reactor or vitrifier also produces a stabilized (vitrify, solidify, make immobile, etc.) potentially toxic substance that is nonleeching to satisfy applicable federal or state guidelines and regulations. The second solid reactor has provisions for adding admixtures as necessary to organically produce stable, nonleachable products. Heat can be added to this reactor in a variety of well-known, conventional methods including plasma arc devices and other similar devices. When processing feedstocks which do not contain detrimental quantities of toxic emissions or undesirable contaminates in the solid residues, the second thermal treatment reactor may not be required.

The third chemical/thermal treatment gas reactor 120 extends the treatment period for the gasses exiting the rotary kiln and the solid reactor. These off gases commingle prior to entering this third reactor normally operating at stoichiometric or excess oxidant operating conditions. This reactor may selectively function during other modes of operation. Where applicable, admixtures, recyclable substances, fuel, oxidants and gaseous feedstocks may be inserted into this reactor. When further chemical/thermal treatment of the off gases is not required, usually during pyrolytic, substoichometric or calcining operations, either or both the rotary kiln and the solid reactor or vitrifier off-gases can go directly to an APCS 130. The off gases may also be directed through a series of cyclone(s) proceeding the APCS to remove excess particulate matter entrained in the off gases. The excess particulate matter collected in the cyclone(s) is recycled to the kiln 11 or the vitrifier if potentially toxic substances are present.

Of course, depending upon the feedstock, the rotary kiln and/or second, solids thermal treatment reactor or vitrifier off gasses may be diverted to an intermediate condenser and/or an absorption tower prior to entering the APCS 130 or the toxic emission containment train 150. The appropriate pathway is determined by the characteristics of the feedstock and/or the value of the byproducts scheduled for recovering. The utilization of one or more gas/vapor condensors and/or an absorption tower in the configuration with or without the use of a gaseous reactor 120 or the APCS 130 is intended to be included in the scope of this invention.

The containment train 150 ensures complete retention of all toxic emissions. The train 150 includes equipment for the separation of three inert gases/vapors/liquids usually present the process: water, nitrogen and carbon dioxide, especially during stoichiometric or excess oxidant operations. Normally the water is recycled to the APCS 130. If released to natural conveyances, it can be cleaned to the appropriate standards. The nitrogen and carbon dioxide can be cleaned to industrial product specifications.

Any other inert gas present may also be cleaned to industrial grade standards. The containment of all toxic emissions (particulate matter, acid gases, metals and organics) and other undesirable constituents requires three operations to be performed in series: subcooling; absorption; and membrane separation.

Subcooling is not required, if the relative humidity of the off gases falls below 20% The typical APCS gaseous effluents are saturated and are between 150 degrees F. to 200 degrees F. Subcooling these gases below 120 degrees F., preferably below 100 degrees F., removes over 90% of the water present and reduces by 25% the quantity of gases to be subjected to further treatment. In addition to removing nearly all of the water, subcooling will remove most of the remaining particulate matter, metals and heavy organics The subcooling may be accomplished by simply passing the gaseous effluents in line 131 through a closed chiller 160 or other similar cooling devices.

On occasion, this dirty water can be directly recycled. The preferred method is to separate the water from the contaminates in a porous membrane configuration 180 with the retentate recycled to the kiln 11 or the vitrifier 42 and the permeate, the clean water, recycled to the APCS 130. If the water is not recycled, it may be necessary to modify the porous membrane configuration and/or provide additional chemical treatment, (e.g. ph adjustment, etc.) to adhere to local natural conveyance discharge specifications.

An absorber 170 is the second unit operation in the toxic emission containment train. Its purpose is to remove and clean the remaining primary inert gas component, carbon dioxide. When the mass quantities of carbon dioxide fall below 20% of the remaining gaseous effluents, this absorption operation is not required. The carbon dioxide flows to a dense phase membrane for separation. The residual carbon dioxide remaining in the retentate can be returned to one of the thermal reactors without having a significant effect on thermal treatment. Other residual acid gases and particulate matter will also be removed by the inorganic absorbent but will be contained when the carbon dioxide is released from the absorbent. An inorganic absorbent is used to simplify the detection of potentially toxic organic emissions. If undesirable constituents are present, and cannot be removed in the stripper column 200 or contained in the absorbent during the regeneration of the carbon dioxide 210, the contaminated carbon dioxide will be isolated and returned to either the rotary kiln 11 or the gaseous thermal reactor for further treatment 231. To minimize contaminated carbon dioxide recycle, a dense phase membrane unit 220 may be installed after the regeneration column, since carbon dioxide is very permeable relative to other gases. Any contaminates will remain in the retentate and are recyclable.

The utilization of condenser/absorption column technology may be incorporated into the domain of this invention to separate and cleanse either organic or inorganic byproducts from the aforementioned rotary kiln, solid treatment reactor or vitrifier configuration and whenever the off-gases from either or both of these unit operations can not be directly released to the environment. This mode of operation is most likely to occur during pyrolytic, substoichometric or calcining modes of thermal treatment; however the determining parameter is the economic value of the byproducts produced in the thermal treatment reactors. Also, this condenser/absorption unit operation may differ from the subcooling/absorption unit operation, described primarily for use with stoichiometric or excess oxidant thermal treatment. For either configuration, the final separation/ containment technology is the utilization of membrane technologies and the return of the potentially toxic emissions to the most appropriate thermal reactor.

The utilization of condenser/absorption technology for byproduct recovery may be quite similar to the condenser/absorption technology used in this invention to separate and clean carbon dioxide; however, it most likely will not. The subject off-gases will be at least 500 degrees F., not between 150 degrees F. to 200 degrees F. leaving the traditional APCS and may not be saturated. Direct or indirect cooling may be utilized with or without the absorption columns. Inorganic or organic absorbents may be used depending upon off-gas compositions and the byproducts to be recovered. Multiple absorbents may be used Also the absorbent(s) may be used as a cooling media. Most likely, it will be necessary to intermittently clean the absorbent(s), unless they become an integral part of the product. Reconstitution of the absorbent(s) may be done continuously or intermittently by utilizing chemical, thermal or membrane technology 230. If membrane technology is selected, porous, rather then the dense phase membranes employed in gas separation should be used. The residuals from the reconstitution of the absorbent(s) should be recycled to one of the thermal reactors. If the byproduct recovery off-gases contain less than 100 ppm or organics they should be directed to the subcooler, unless the relative humidity is less than 20% and the temperature is less then 100 degrees F. If these off-gases also contain less than 20% carbon dioxide, they can be directed to the dense phase membrane unit operation otherwise these residual off-gases should be directed to the subcooler, unless the relative humidity is less than 20% and the temperature is less than 100 degrees F. If these off-gases also contain less than 20% carbon dioxide, they can be directed to the dense phase membrane unit operation otherwise these residual off-gases should be directed to the absorption tower within the toxic emission containment train.

The last unit operation in the toxic emission containment train is the membrane configuration using dense phase or coupled transport membrane materials 190 to separate and clean carbon dioxide and oxygen present, although inert gases can be recycled. Trace quantities of the halogen and noble gases, if present, will be included in this permeate stream 191. Potentially toxic emissions and other undesirable contaminates with a molecular weight greater than 40 can be recycled or reclaimed. Should the off-gases directed to the dense phase membrane configuration, with a molecular weight greater than 40, contain valuable byproducts in addition to the potentially toxic emissions, or other undesirable contaminates, this process stream can be directed to a byproduct recovery system for further treatment. The remaining off-gas constituents in stream 192 will have a molecular weight between 15 to 40. The primary substance will normally be nitrogen and it should adhere to industrial grade specifications. Should contaminates be present, special purpose dense phase or coupled transport membrane stages can be added to separate and recycle the contaminates. The utilization of other chemical treatment technologies to provide byproducts in this molecular weight range is within the scope of this invention.

3. Example of Preferred Process

The preferred process example depicts the optimum configuration when simultaneously processing all physical forms (solids, liquids and gases) of feedstocks each containing all categories of toxic emissions or generating undesirable contaminates during treatment. For this the most frequent situation application of this invention focuses on chemical reactions involving an open flame in at least one of the treatment reactors which is operating on a temperature greater then 250 degrees F.

FIG. 8 shows a simplified general arrangement schematic of the proposed system which is comprised of four major subsystems: 1) oxidation; 2) vitrification; 3) absorption; and 4) membrane configurations. The schematic emphasizes the novel use of proven technologies (vitrification, absorption and membranes) and the interfaces between the novel and the more traditional thermal treatment technologies, (combustion, flue gas cleaning). From a total capital cost viewpoint, the implementation of these novel technologies represents less than 20% of the total configuration installed cost. In the most simplistic terms, the vitrifier is used to eliminate the possibility of leachates in the ash, the absorption system's primary purpose is to separate and clean the $CO_2$ generated during the thermal treatment process, and the membrane systems are used to separate and contain toxic emissions and other undesirable substances. In addition membrane configurations can be used to separate and contain valuable by-products before, during or after the separation and containment of toxic emissions and other undesirable substances.

The recommended oxidant is pure oxygen rather than air. Enriched oxygen combustion technology improves flame stability and heat transfer while providing the mechanisms for more reliable toxic substance containment due to the utilization of flue gases rather than the nitrogen in the combustion gases as a flame coolant. Also, the NOx emissions resulting from the nitrogen in the combustion air are eliminated.

There are three nearly independent process modifications central to this presentation which must occur to achieve the stated objectives-good combustion practices, flue gas reduction, and containment of flue gas PTEs. Each process modification will be addressed in subsequent sections.

4. Good Combustion Practices

The purpose of this section is to focus on the combustion practices that will prevent PTEs "acid gases, particulate matter, metals and organics" from being generated or emitted to the environment, since chemical reactions directly involving some type of open flame involvement represent the most frequent application of this invention.

The focal point of this discussion is the partitioning of these PTEs into flue gases and ash. To the degree possible, these two pathways will be discussed separately. FIG. 1 shows the rotary kiln and vitrifier operating in series with the off-gases of both unit operations flowing to another combustion chamber or gaseous reactor. FIG. 1A shows the manner in which the vitrifier is integrated into the new configuration. It replaces conventional wet ash collection/ removal systems. For the sample mass balance, discussed later, there is a throughput of 2722 kg/h of ash. The vitrifier reactor volume required will be approximately 0.75 m(3) (Oden, O'Conner 1994). This volume represents the nominal space requirements for comparable wet ash collection/ removal processing equipment. With this arrangement, the rotary kiln acts as a preprocessor for the vitrifier and allows the vitrifier to operate in a steady state without major swings in the production of flue gases. It is also more energy efficient and requires fewer processing steps than nontandem operations.

5. Flue Gas Generation

A draft version of the EPA Combustion Emissions Technical Resource Document (U.S. EPA 1994) notes the relationship between the generation of "dioxin-like" emissions and quantities of particulate matter in the flue gases. The preliminary findings are that the more particulate matter in the flue gases, the more "dioxin-like" emissions. New technology is incorporated in the rotary kiln design to minimize the generation of airborne particulate matter; therefore, less dioxin-like emissions should be generated as well.

The purpose of the rotary kiln is to separate the waste constituents which volatilize below 760 degrees C. before subjecting the residuals to higher temperatures in the vitrification unit. The majority of the constituents which volatilize below 760 degrees C. fall into two categories: water (aqueous solutions) and organics. It is imperative that these substances be removed before the residuals are subjected to higher temperatures in the secondary solids thermal reactor or melter as the volumes of these volatiles will increase about 5000% over their volumes at ambient temperatures. Also, fission products (e.g., $RuO_4$, CS+ salts, TcO salts, IH and I) will volatilize at these temperatures. Any Carbon 14 and tritium will also volatilize as $CO_2$ and $H_2O$ respectively. The rapid expansion of these substances can result in detrimental chemical/physical reactions in the secondary solids thermal reactor or vitrification process or in the unit operations downstream of the vitrification unit.

The operating temperature in the rotary kiln should be maintained above 760 degrees C. This temperature is sufficient to provide the heat flux necessary to volatilize the aqueous and organic material present in a 30-minute to 1-hour residence period available in most kilns. When higher temperatures (in the 871 degree C. to 982 degree C. range) are used, a greater heat flux is generated and the volatiles are removed more rapidly; however, this mode of operation has the potential for producing two types of detrimental actions: 1) the higher gas velocities increase the particulate carryover which in turn, becomes the source for other detrimental consequences; 2) the higher temperatures could cause premature vitrification (solidification, slagging). Some solid substances present begin to liquefy below 871 degrees C., they are usually not present in sufficient quantities to be of concern.

In the traditional kiln, the combustion reactions are controlled indirectly bye single temperature reading. Water content variations can cause 427 degrees C. temperature variations in the kiln, Organic content variations can cause excessively wide temperature variations. These compositional variations, coupled with the time required to raise the feed material to the ignition temperature, cause the combustion reactions to follow a pattern which lags the feed charge by 90 degrees. Once the combustion reactions for an individual charge begin, they go to about 80% completion without any direct means of control. The result of this combustion pattern is that optimum flue gas flow rates are maintained less then 25% of the time. When the combustion reactions peak, most of the reactions are occurring in the bed rather in the preferred gas/vapor phase above it. This less desirable in-bed firing creates excessive particulate carryover, especially during peak reaction rate periods. During these peak periods gas retention time is reduced and there will be less homogeneous mixing of the combustion air and the organic vapors exiting the solid feed charge. The above disclosed Cyclonic Combustion Device with Sorbent Injection and Zone Control or multi-purpose manifold is recommended to minimize the oscillation caused by these compositional variations; it divides the kiln into four sectors or zones and delivers fuel, oxidant and cooling media to and are inserted into the reaction zones perpendicular to the longitudinal kiln axis. This action produces a subtle cyclonic, torrodial effect which distributes the solid particles more evenly over the hot kiln surface, especially along the latitudinal axis; see FIGS. 2 and 2A. The net effect of this action is a longer solid particle residence time and a more intimate mixing of the hot gases/vapors with the subject solid particles. This action provides a higher solid burnout rate than that experienced in a traditional kiln. Further, the insulated conduit or multi-purpose manifold is located in the upper half of the kiln cross-sectional area. As a result, most of the combustion occurs in the hot vapors residing at the top of the kiln; therefore excessive bed turbulence is minimized and particulate carryover is reduced.

The proposed rotary kiln will be equipped with seals especially designed to eliminate outleakage when mistakes occur and the kiln is pressurized for a short period of time. A portion of the recovered $CO_2$ is inserted into the manifold around the seals at a pressure higher than that recorded inside the kiln. A constant positive differential is maintained between the manifold and the kiln internal pressure. This mode of operation maintains minimum allowable inleakage for seal cooling and prevents outleakage even if the kiln pressure becomes positive. These kiln modifications provide a means of reliably operating the kiln in a reduction mode, which is attractive when the waste composition contains low-water and high-organic content because it provides ample heat for volatilization of water and organics with minimum particulate carryover without allowing premature vitrification.

6. Ash Composition

A relatively recent concern is that most incinerator configurations will not continuously produce a sterile (nonleachable) ash. During the last 10 years, various studies have been conducted on the characterization of hazardous waste incinerator residues. One industry wide survey sponsored by EPA produced typical results (Van Duren et al 1987). Some 43 organic priority pollutants (19 volatile, 24 nonvolatile) were tested for in the residues from hazardous waste incinerators. Levels of organic priority pollutants were found in all residues with the total quantity present varying between 10 ppm to 2000 ppm. About eight organic priority pollutants appeared in the samples from the majority of the sites. Similar results were found when conducting metal analysis on the same residues. Ten metals were tested for and some combination of metals were found in all residues. The total quantities of these metals varied between 365 ppm and 44,763 ppm. This range of variability was significantly wider than the comparable range for organic priority pollutants.

Other metals tested for and the maximum concentrations (ppm) found were: arsenic (27); beryllium (6); cadmium (61); mercury (15); selenium (19); silver (190); thallium (9). From a mass balance viewpoint, another important metal study was conducted on a single incineration configuration and assessed arsenic, cadmium, lead beryllium and chromium pathways. This study revealed that 60% of the metals fed exited the system with the incinerator ash (Hindshaw 1994).

For the purposes of this invention, it is assumed that 2000 ppm of organic constituents and 50,000 ppm of metal compounds remain in the incinerator ash. It is not relevant to determine the original source, whether attached to the surface of the solids; dissolved in the water; or the organic substances; or chemically bonded to the solids, water, or organics. These values have negligible impact on equipment sizing; still further treatment is required to prevent these PTEs from being emitted to the environment.

7. Ash Vitrification

During normal operations, the residual inert material transverses the kiln in 40 minutes and exits the kiln at a temperature 93 degrees C. less than the gas exit temperature. A minimum kiln residual temperature of 649 degrees C. is required to ensure that organic volatiles are not present in all types of residuals. In the recommended configuration, the kiln residuals drop directly into a secondary solids thermal reactor, melter and vitrification furnace which also accepts admixtures and can operate at any desired temperature less than 1649 degrees C. Normally, vitrification temperatures fall between 1260 degrees C. and 1371 degrees C., bath temperature. Higher temperatures are normally used in metal refining. Admixtures may be used in either vitrification or metal refining. The technical features that distinguishes metal refining from vitrification are that nearly all the solids must be liquefied to achieve metal segregation that occurs by differences in specific gravity whenever the thermal reactor residence time is sufficient to allow stratification after liquification. On occasion there may be valuable metals present which will volatize below the desired operating temperature. These metals can be separated before or after commingling with the kiln off-gases.

If it is not possible to address all vitrifier feed stocks in combinations with all metals of interest; however, unless specifically stated, the feed stocks in question will be solids and will not generate water and/or organic vapors greater than 5% of the charge, with minimum quantities of water and hydrocarbons. The predominant off-gases are volatile compounds, carbon monoxide, and carbon dioxide. The ASME/U.S. Bureau of Mines report provides a detailed analysis of the quantities and composition of vitrification off-gases. This report provides an upper bounds for toxic emissions from this source since most hazardous waste incinerators have a more sterile ash (Oden, O'Conner 1994).

The primary processing variable in a high-temperature furnace is slag control. In metal refining, slag is comprised of the lighter undesirable metal compounds and residual admixtures which float to the top of the molten bath in the furnace where they are periodically removed through the tap in the side wall. Slag control is accomplished with the proper proportioning of admixtures while maintaining a specified temperature to product the viscosity required to provide a turbulent homogeneous mixture in the upper region of the furnace. The primary chemical reactions occur in the upper region. The volatiles which are produced leave through the off-gas vent in the roof. Any free metal which has a volatilization temperature below the furnace operating temperature will be included in these off-gases. Recovery of the free metals in the off-gases is technically possible via selective condensation in metal condensers. A fraction of these volatile metals remains in the slag in the form of metal/mineral complexes. The heavier free metals in the turbulent region settle by gravity into the quiescent zone in the lower region of the furnace where further metal separation occurs due to differences in specific gravity. The product molds can be modified to satisfy packaging/transportation guidelines. Dual plasma torches or other conventional vitrifier heat sources can be provided to maximize on-stream time.

High-temperature furnaces are used throughout the world for numerous types of metal refining of ores from deposits comprised of a wide variety of high-metal content minerals. This is possible because the thermodynamic properties and the composition of the constituents are well known. Although all combinations of radioactive metals have not been evaluated, the available research is favorable and there is no technical reason to believe that the isotopes will behave significantly differently than the nonradiated elements from a thermodynamic viewpoint. The basic assumption is that the technology is feasible and available, but its use is fundamentally an economic decision.

8. Combined Secondary Oxidation

There is a seal between the vitrifier and the kiln discharge breeching. The kiln discharge breeching is always under negative pressure; therefore, the vapors generated during vitrification will flow directly into the secondary combustion chamber or thermal gas reactor and mix with the kiln off-gases prior to being subjected to further treatment. The vitrifier or secondary solids thermal reactor/molter vapor flow will not be significant. They represent less than 5% of the kiln's off-gases into the vitrification furnace, which in turn represents only a fraction of the charge to the rotary kiln The primary substance classification of the vitrifier off-gases will be inorganic molecules, compounds and/or complexes. The retrofitting of the vitrifier to an existing incinerator system should not cause the incinerator to be downrated from a throughput viewpoint. Volatilization of some fission products in this stream is likely. Ruthenium, cesium, technetium, and iodine are volatile. Other radionuclides will be carried in the gas stream sorbed on fine particles contained in the flue gas. The kiln and vitrifier off-gases flow into the second-stage thermal gas oxidizer and reactor where the gas/vapor temperature is elevated to between 982 degrees C. and 1204 degrees C. in the presence of excess oxygen to reduce the residual organics to $CO_2$ and water. If required, fuel will be added to achieve the desired operating temperature.

9. Flue Gas Cleaning

A combination type air pollutant control system (APCS) is preferred. In this arrangement, the flue gases will be quenched to the appropriate temperature levels prior to particular removal and neutralization. As the gas cools, cesium and technetium salts will drop out of the gas as solids. Much of the ruthenium and iodine will be held up in the caustic scrubber. After the particulate is removed, it will be briquetted and inserted directly into the vitrifier. Most of the radionuclides that exit the thermal treatment system will be associated with this particulate matter. The blowdown from the neutralization process can be reintroduced into the process with the quench water. If large quantities of solids are present, filtration may be required prior to mixing with the quench water. The solid residues would be inserted into the vitrifier.

There are several other flue gas cleaning configurations which are capable of producing the removal efficiencies used in this study. Should these configurations not be capable of operating in a closed loop manner similar to the one described, the open stream(s) can be integrated into the proposed extended flue gas cleaning arrangement if required. The draft report of the Combustion Emissions Technical Resource document depicts Cumulative Distributions of the Hazardous Waste Industry (HWI) Particulate Matter (PM). This type industry-wide data, from multiple APCSs, was used in this study. The sizing of the PTE containment equipment is not sensitive to these minute quantities. The assurance that these constituents can be contained is the relevant issue.

10. Flue gas Reduction

For a comparable feed rate, the quantities of flue gases emitted from the proposed configuration are about 20% of the flue gases emitted from a traditional rotary kiln configuration. About 50% of this reduction is due to the use of pure oxygen rather than air as the oxidant. The other 50% is due to using cold flue gases to reduce flame temperatures previously cooled by the nitrogen in the combustion air. Also, when pure oxygen utilization is coupled to flue gas recycle cooling, about 60% of the flue gases leaving the traditional APCS outlet are recycled. This recycle automatically doubles the treatment time for 60% of the PTEs, thereby ensuring a significant reduction of PTEs entering the toxic emission containment system.

11. Sub-Cooling

Sub-cooling reduces the non recyclable flue gases by 36% by removing most of the water, thereby reducing the quantities of flue gases which must be subjected to further cleaning. All the water removed can be recycled; the recycled water reduces cooling water requirements.

Regardless of the APCS configuration used, the flue gases normally exit at saturated conditions between 71 degrees C. to 82 degrees C. depending upon ambient conditions. By lowering the temperature of the flue gases from 82 degrees C. to 38 degrees C., 1976 kg\h of the non recyclable flow rate is eliminated from potential emission quantities. The condensing of these water vapors removes 94% of the water in this flue gas stream. A faction of the PTEs are chemically bonded with the water and will be removed with the water. A fraction of the PTEs exist as fume nuclei in the flue gas stream and will be encapsulated during the water condensation process. Another fraction will condense due to the lowering of the temperature. Table IV depicts the anticipated pathways through the condenser for each PTE Category.

The removal of 50% of the halogens and the sulfur constituents is believed to be conservative since the majority of these substances are soluble in water and have low vapor pressures. Most of the residual nitrogen, if present, will probably be in the form of NO which has a very low solubility; therefore, it will remain in the gas/vapor phase. Most of the inorganic metals will be removed with the water as most are reasonably soluble or have low vapor pressures. The particulate matter is considered to be submicron inert mineral matter. A fraction of the particulate matter will become encapsulated during the condensation of the water. These enlarged particles will drop out of the flue gases. This capture mechanism will also enhance the removal of heavy materials remaining in the flue gases in the form of fume nuclei or colloids.

These categories may contain dioxin-like compounds. Should it be necessary to treat this waste stream, 85% of 90% of this water could be purified by the utilization of membrane technology similar to reverse osmosis systems used to provide drinking water throughout the world. Over 90% of the inorganic metals, the hydrocarbons and the particulate matter would remain in the retentate. This retentate should be treated with appropriate admixtures and returned to the vitrifier. The permeate should be recycled to the APCS.

12. Absorption

The purpose of this configuration is to remove and clean the carbon dioxide prior to release. The amount of carbon dioxide present represents 73% of the flue gases to be released from the system. Theoretically, membranes could also be used to make this separation at a reduced cost; however, as this is the primary stream to be released, special attention is given to ensure effective cleaning during transient operating conditions. The absorption process requires two phase changes; therefore, more effective separation is anticipated. During the liquid processing phase, adequate hold up time is available for sampling and analysis. Special provisions have been made to reprocess off-specification material. The intermittent recycling step is not reflected on the subject schematics. Table V shows the manner in which the inert gases and the PTEs are partitioned in the absorption tower. An inorganic absorbent was used to ensure more effective detection of organic PTEs.

Carbon dioxide is a weak acid gas; therefore, all stronger acid gases will be removed as well. The absorption tower is designed to create intimate contact between the liquid and the gases over an extended period to facilitate mass transfer from the gases to the liquid. Any metals and particulate matter will be in the submicron size range. It is not anticipated that there will be any chemical reactions between the metals, particulate matter and liquid, but it is anticipated that there will be a physical attachment among these substances with the result that most metals and particulate matter will reside in the liquid after passing through the tower.

The process configuration containing the absorption tower also contains holding tanks and a stripping and regeneration column. The purpose of the holding tanks is to provide adequate residence time for sampling and analysis prior to disposition. When no PTEs are present, the contents of a holding tank are transferred to the regeneration column where heat is applied to separate the carbon dioxide from the absorbent. An ultraconservative approach would be to install an optional membrane unit between the regeneration column and the industrial grade carbon dioxide storage tanks to ensure containment of trace contaminates. Periodically, it will be necessary to remove the trace contaminates accumulating in the absorbent by filtration, neutralization/precipitation or crystallization with membrane filtration being the most likely technology utilized. When PTEs are found in the holding tank, the contents are transferred to the stripping column which contains the mechanism for applying heat over a wide range of operating conditions to ensure that the contaminate(s), whether they remain in the liquid or gas phase, are contained.

13. Membranes

The commercial development of membrane technology extends over 50 years. Over time, the application of membrane technology has been divided into five categories: microfiltration, ultrafiltration, hyperfiltration (reverse osmosis), gas permeation and pervaporation. Microfiltration and ultrafiltration focus on solid-liquid separation, hyperfiltration (reverse osmosis) provides liquid-liquid and liquid-gas extraction while gas permeation deals with gas-gas separation. Pervaporation utilizes pressure differentials as well as membrane materials to separate pressure sensitive liquid-liquid and liquid-gas fractions. The overall membrane pore size ranges from 2 angstroms to 2 microns. All of these membranes technology classifications may be used in the proposed toxic emission containment system.

Most of the commercialization of gas-gas separation has occurred over the last 20 years. Technical advances during the last decade have increased some types of gas separation efficiencies 200–400% (Spillman 1989). This rapid growth rate makes technical and economic comparison difficult. Another comparison complexity arises because many membrane separation processes do not neatly replace existing separation processes, but complement them. This is most true in the current situation. In general, membrane configurations are very flexible, require low capital investment, are easy to operate with low energy consumption, are cost effective even at low gas volumes, and have good weight and space efficiency (Spillman 1988). Separation is primarily achieved by correlating the particle size and/or molecular weight of the substance to be removed with the pore size in the membrane. This simple correlation is effective when the particle size is greater than 10 A degrees (1 nanometer, a molecular weight greater then 200). Here, the focus is on volatile combustion byproducts leaving the absorption tower. These byproducts will have a molecular weight less than 100 (less than 4 A degrees). Many of the combustion byproducts will have a molecular weight less than 50. In this particle size range two other parameters are also controlling: permeation and solubility. The membranes used in this gas-gas separation range are referred to as nonporous or dense phase membranes since they are not manufactured according to precise pore site specifications. Table VI presents an overview of the requisite gas-gas separation information for dense phase membranes. Either porous or dense phase membranes can be used in pervaporation applications involving pressure-sensitive fractions.

This table does not show any metal data. Most metal substances will have a molecular weight greater than 50 and will fall in category 3, a class of compounds which can be relatively easily separated at or above the 90% removal rate. Lithium, Beryllium, and Boron are potential exceptions depending primarily upon the substance forming the chemical bond. FIG. 8 depicts two membrane treatment of the absorption tower off-gases. Category 1 and 3 gases are recycled to the rotary kiln thermal oxidizer. Category 2 gases are candidates to be transferred to nitrogen storage.

An optional precursor unit operation prior to the first membrane stage would be a condenser to remove most of the water from these flue gases in order to minimize contamination in the residual effluent. For steady state conditions, it is estimated that less than 10% of the potentially toxic emissions would be removed; however, there is economic benefit, especially if the other optional condensers are utilized.

The first membrane stage will remove only trace quantities of potentially toxic emissions which does not appear to have merit from a processing viewpoint. The merit emanates from containment considerations and extending the life of the membranes used in the second stage.

This first stage membrane will not allow potentially toxic semi and nonvolatile organic and particulate matter to proceed to the second membrane stage where the potential for being emitted to the environment is greater. All minute quantities of these substances will be recycled to the oxidation chamber. The purpose of the second stage is to separate Categories 1 and 2. Table VIII shows the results produced in the second membrane stage.

The light fraction will be recycled to the oxidation chamber since it contains reusable oxygen and the majority of the residual potentially toxic organic emissions. The heaver fraction category represents the other emission stream. The primary constituents in this heavier fraction stream are nitrogen (97%); oxygen (2.74%); water (0.22%); carbon dioxide (0.05%).

14. Membrane Process Configurations

An overview of the respective membrane separation ranges for all membrane classifications is reflected in Table IX. Sample applications for each of these membrane subclassifications are shown in Table XI. Microfiltration and ultrafiltration focus on solid-liquid separation, hyperfilteration (reverse osmosis) provides liquid-liquid and liquid-gas extraction while gas permeation deals with gas-gas separation and pervaportation is utilized to separate pressure-sensitive fractions. The overall membrane pore size ranges from 2 A to 2 microns. All of these membrane technology classifications may be used in the proposed toxic emission containment system.

From a toxic combustion by-product viewpoint, microfiltration and ultrafiltration membranes can be used to remove rogue particulate matter as well as nonvolatile and semivolatile organics present in the form of colloids and emulsions. Reverse osmosis membranes can be used to remove soluble inorganic metals and most organic compounds with a molecular weight greater than 100. Porous gas permeation membranes, the type membranes reflected in Table XI can be used to separate residual gases; however, this mechanism is quite limited due to the low separation factors that can be achieved with this type membrane material. It should be noted that there is overlap in the pore size ranges between ultrafiltration, hyperfiltration and gas permeation. The pore size range for ultrafiltration is between 10 Å–1000 Å. Ultrafiltration membranes are capable of removing most nonvolatile organics. The pore size range of hyperfiltration is 5 Å–20 Å. This class of membranes will remove most semivolatile hydrocarbons and inorganic metal contaminants. To achieve effective separation of volatile "organic" and nonorganic gases, the membrane pores should be less than 10 Å.

For the stated objectives, it is sufficient to recognize that there are three different types of membranes available: porous, nonporous (dense phase), and coupled transport. Coupled transport, also called liquid membranes, can be viewed as an extension of the dense phase membranes. During the last decade, many of the major development activities have been in the area of dense phase membranes. As the terms suggest, these membranes do not have pores in the conventional sense. The gases are instead separated on the basis of their solubility in, and diffusivity through, the membrane material. Many of the early applications were directed toward the hydrocarbon processing industries for the recovery of hydrogen, carbon dioxide, C1–C6 aliphatics and C6–C8 aromatics (Bollinger 1982). Some of these systems were installed in the late 1970s. There are currently numerous applications throughout the hydrocarbon processing industry with gas throughputs 5 to 20 times the gas throughputs required for most industrial combustion systems. It was reported that one of these systems rated at $20 \times 10^6$ SCFD (13,888 scfm) was placed on a module 9' wide×9' high×12' long (Coady 1982).

In sum, the more recent membrane technology developments focused on the manufacture of the membrane material with most current developments addressing the separation of the lighter gases (N2, O2, etc.) Another new development of interest is the extended recovery of hydrocarbons previously hampered by premature condensation of heavier (semivolatile) hydrocarbons on the membrane surface due to the depletion of lighter gases in the retentate (Spillman 1989). Of special interest, especially when processing nuclear wastes, are the development activities associated with liquid membranes which were first created in 1968 (Lu Ind. Eng. Chem. Process Design & Development 1971). Liquid membranes consist of a contained liquid between two membranes. The permeate must be transferred across both membranes. The contained liquid facilitates the transport without a permanent physical or chemical change in makeup. An analogy can be seen with hemoglobin in the blood. Hemoglobin is a transport liquid which circulates through the body delivering oxygen through the blood vessels from the lungs to the terminal tissues. It is not possible for the hemoglobin to diffuse across the membranes because it is too bulky with a nominal molecular weight of 65,000. A more complete discussion on liquid membranes is available in various sources (MacNeil 1988; Toshima). The two potential usage areas are 1) the enhanced separation of oxygen, nitrogen and volatile organics; and 2) specie specific removal for secondary waste reduction, especially radioactive metals.

Most of the commercialization of gas-gas separation has occurred over the last 20 years. Technical advances during the last decade have increased some types of gas separation efficiencies 200–400% (Spillman 1989). This rapid growth rate makes technical and economic comparison difficult. Another comparison complexity arises because many membrane separation processes do not neatly replace existing separation processes, but rather complement them. This is most true in the current situation. In general, membrane configurations are very flexible, require low capital investment, are easy to operate with low energy consumption and are cost-effective even at low gas volumes and have good weight and space efficiency (Spillman 1988). Separation is achieved by correlating the particle size and/or molecular weight of the substance to be removed with the pore size in the membrane. Table IX correlates the membrane technology categories with the particle size ranges for various types of substances defined and quantified in the previous section.

This simple correlation is effective when the particle size is greater than 10 angstroms (1 nanometer, a molecular weight greater than 200). Here the focus is on volatile combustion by-products leaving the absorption tower. These by-products will have a molecular weight less than 100 (less than 4 angstroms). Many of the combustion by-products will have a molecular weight less than 50. In this particle size range two other parameters, and solubility are also controlling permeation. The membranes used in this gas-gas separation range are referred to as nonporous or dense phase membranes since they are not manufactured according to precise pore size specifications.

Most metal substances will have a molecular weight greater than 50 and will fall in Category 3, a class of compounds which can be relatively easily separated at or above the 90% removal rate a nondense (porous) membrane material. Reverse osmosis, a nondense membrane material, has been used successfully to separate soluble metals for over 20 years. Lithium, beryllium, and boron are potential exceptions, depending primarily upon the substance forming the chemical bond.

Although there are frequent improvements relative to the composition and manufacturing techniques associated with membrane material, the manner in which the membrane material is incorporated into the process configuration has been relatively consistent over the last two decades. Typically, the membrane material is spirally wrapped around a porous discharge pipe (2-ft to 6-ft long) and inserted into a larger diameter (4" to 12") cylinder. On occasion, the outside containment cylinder may contain more than one spirally wrapped bundle. For a given feedstock and product composition, operating temperature and pressure, and membrane material, the amount of membrane surface area required can be determined in a straightforward manner. Operating flexibility and feedstock variations determine to a large extent the measure in which the most appropriate process is configured. Several examples are cited.

Figure 9:
FIG. 9 is a flow diagram for a single-stage toxic emission containment system.

FIG. 9 shows that the feedstock is divided into two streams: the permeate is the feedstock passing through the membrane; the retentate (residue) is that fraction of feedstock which is retained by the membrane. Normally, particulate matter, metals, nonvolatile and semivolatile organics will remain in the retentate while the recyclable volatile organics may be in either the permeate or retentate depending upon the membrane material selected.

Figure 9A:
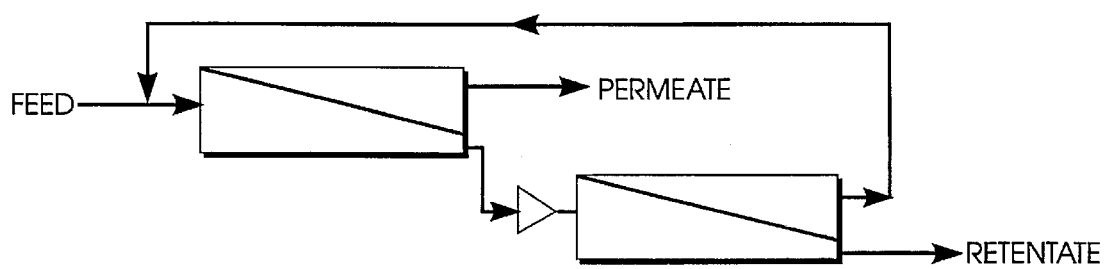
FIG. 9A is a flow diagram for a two-stage toxic emission containment system with a recycle stream; and, FIG. 9B is a flow diagram for a multiple stage toxic emission containment system.

FIG. 9A shows three forms of complexity. First, multiple stages are frequently used because it is not always possible to obtain the desired concentrations in both the permeate and retentate streams in a single stage unless there is a significant difference in the molecular weight of the substances to be separated. Second, it is not necessary to use the same membrane material in both stages. Third, recycling can be used to enhance the separation factor. Either the permeate or the retentate can be recycled. In either situation, recycle enhances separation when process flows fall below normal. Conversely, higher than normal flows will not produce deleterious separation factors unless these higher flow rates prevail over an extended period.

Figure 9B:
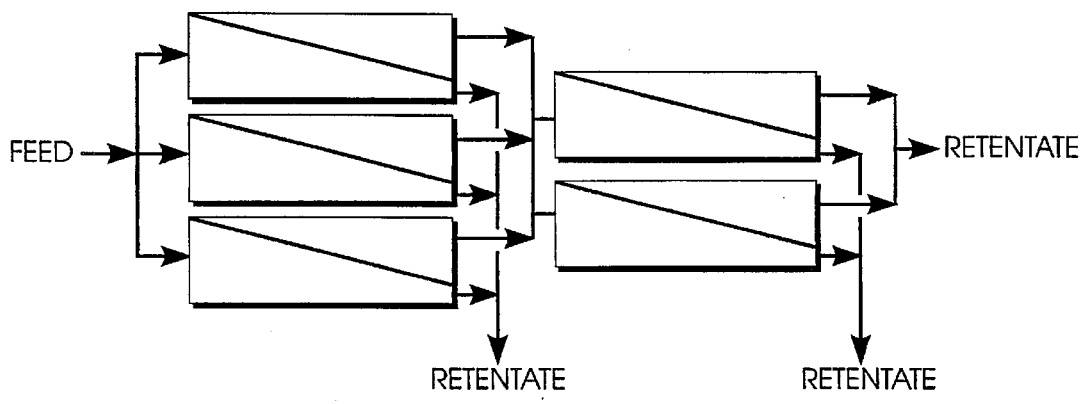

FIG. 9B provides the greatest operating flexibility for minimum incremental costs. This configuration shows two retentate and one permeate effluent. It is obvious that with minor piping modifications, it is possible to obtain one retentate and two permeate effluents. Any one of these streams can be fed forward or backward in the process. There usually are less cylinders in the downstream stages since substances are being withdrawn between stages. The major advantage of having multiple cylinders in the same stage is that tube bundle segments which have deteriorated can be replaced without taking the entire configuration offstream. Normally, it is possible to isolate individual cylinders within a given stage to remove the damaged tube bundle. Usually the tube bundles near the discharge are most susceptible to damage. The resulting temporary increase in flow to the other cylinders in the stage will not significantly reduce product quality. At sometimes when the feedstock is unusually dirty, backwash and chemical treatment systems are included to refurbish individual or multiple cylinders in the configuration. Recycle lines can be incorporated into this design.

The previous examples were selected to show the manner in which membrane technology could be used to effectively contain all PTEs by complementing existing equipment and to demonstrate the operating flexibility for separating particles being transported in either a gas or liquid media and where the particles are less than 2 microns, with emphasis or particles less than 50 Å. The evolution of membrane development has resulted in what appears to be the application of five distinct technologies whereas Table IX shows these technologies to lay on a continuous spectrum of particle sizes between 5 Å to 2 microns with the most recent technology development activities occurring with the separation of smaller and smaller particles. The most recent technology development has occurred in the manner in which the membrane materials are manufactured. The method for constructing the modules used in the field has been relatively consistent over time. For this reason, particle size distribution and concentration levels are the critical design parameters when utilizing membrane technology.

Table X shows three potential membrane applications. Two applications involve separating solids from gas media (gas-gas separation): the absorber and regenerator off-gas streams. The other application involves solid-liquid separation; the sub-cooler condensate and the optional intermittent solid-liquid separation unit on the absorbent recycle line which is not shown. The absorber off-gas membrane configuration will require two or more stages due to the similarity in gas permeation rates (see categories 1 and 2, Table VI). The other applications should not require more than two stages unless there are unusually high concentrations of acid gases, metals or nonvolatile organics present.

15. Analysis of Emissions to Release

All emissions will be analyzed prior to release. The same methodology will be used for both carbon dioxide and nitrogen gaseous emission streams. Parallel holding tanks will be used. Analysis time requirements are six minutes for organics and any single or multiple volatile contaminate(s) can be used to specify release specifications. When radionuclides are present, the gases will be released from the system only after they have been held up long enough to assure no radionuclides are present (or more precisely, below release limits). The holdup time will be a function of the radioactive release criteria; the lower the limits, the longer will be the holdup (counting) time. Analysis for radionuclides will be done by alpha and beta/gamma counting. The analysis time will be inversely proportional to sample volume. Also, the lower the required release limits, the longer the analysis time will be.

16. Summation

The PTEs, which may be generated at some point in combustion and flue gas cleaning process of hazardous wastes, into four categories: acid gases, particulate matter, metals, and organics. By using four types of existing technology: vitrification, sub-cooling, absorption and membranes, showed how 99% of these PTEs can be eliminated or contained. The specific incremental reductions of PTEs are:

1. The total gaseous emissions from the recyclable configuration is 13.3% of the total gaseous emissions from a BDAT configuration.
2. There are 10 ppm to 2000 ppm organic and 365 ppm to 44,763 ppm metal priority pollutants in the bottom ash of BDAT incinerators. These potentially toxic substances will either be removed or chemically bonded to contain these substances within the residue.
3. There are about 200 ppm of acid gas constituents leaving a BDAT incinerator. This value will be reduced to 2 ppm in the recyclable configuration.
4. There are 39 ppm of particulate matter leaving a BDAT incinerator. This value will be reduced to 1 ppm in a recyclable configuration.
5. There may be 5 ppm of semi-and non volatile potentially toxic organic compounds, including a dioxin-like emissions, leaving a BDAT incinerator, which will be contained in a recyclable configuration.
6. There may be 8 ppm of volatile organic emissions leaving a BDAT incinerator. If so, 6 ppm (75%) of these constituents will be contained in a recyclable configuration.

From the foregoing description, it will be recognized by those skilled in the art that an advanced slagging/vitrifying cyclonic rotary kiln thermal treatment system offering advantages over the prior art has been provided. Specifically, the advanced slagging/vitrifying cyclonic rotary kiln thermal treatment system provides a means whereby selected feedstocks, including all types of materials and wastes may be thermally treated, processed, and volumetrically reduced and output of a vitrified waste form encapsulated within a glass or ceramic product or an optional ash product may be discharged. The advanced slagging/vitrifying cyclonic rotary kiln thermal treatment system of the present invention provides the means for selectively varying the flame characteristics in the independently-operable, longitudinally-successive treatment zones of the rotary kiln primary combustion chamber in order to achieve a maximum process efficiency of thermally treating the selected feedstocks.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for treating feedstock materials to remove contaminants therefrom and to produce a volumetrically reduced, stabilized disposable solid product and/or commercially valuable solid, liquid or gaseous byproducts, said process comprising the steps of:

(a) thermally treating said feedstock and oxidizing organic contaminants present in a rotary kiln, and outputting solids, liquids and gases;

(b) vitrifying, refining and separating solids exiting said rotary kiln and outputting said stabilized products and gases;

(c) reacting gases from steps (a) and (b) in a gaseous thermal treat and outputting gases; and, (d) treating said gases from said step (c) by removing particulate contaminants therefrom and selectively recycling said contaminants to said step (a), (b) or (c).

2. The process as defined in claim 1 wherein said step 1 (d) comprises the treatment steps of:

(a) subcooling said gases from said step (1) (d) to remove dirty water therefrom;

(b) passing said subcooled gases from step (a) through an absorption unit to separate carbon dioxide from said recycled contaminants; and, (c) passing said recycled contaminants from step (b) through a membrane separation system to remove remaining by-product gases from said recycled contaminants.

3. The process as defined in claim 2 wherein said step 2 (b) comprises the further steps of:

(a) passing said subcooled gases from step (2) (b) through an absorber operatively coupled to at least one stripper to separate carbon dioxide from said recycled contaminants;

(b) passing said separated carbon dioxide from step (a) through a dense phase membrane to separate industrial grade carbon dioxide from said contaminants; and, (c) storing and testing said industrial grade carbon dioxide from step (b).

4. The process as defined in claim 2 wherein said step 2 (a) comprises the further step of passing said dirty water through a porous membrane for separating water from said recycled contaminants.

5. The process as defined in claim 2 wherein said membrane separation system comprises a first and second dense phase membrane separation units.

6. The process as defined in claim 1 wherein said step 1 (a) comprises the steps of:

passing said feedstocks internally through a generally cylindrical combustion chamber;

rotating said kiln about a longitudinal axis;

thermally treating feedstock tumbling through said chamber with a multiple purpose manifold supported within said treatment chamber substantially parallel to said longitudinal axis, said manifold establishing a plurality of separate, independently operable and longitudinally successive treatment zones for independently inserting admixtures, coolants, recycled flue gases, fuels and oxidants for establishing separate and distinct thermal operating parameters;

fueling said manifold within said plurality of longitudinally successive treatment zones;

delivering oxidizer to said manifold within said plurality of longitudinally successive treatment zones; and, independently establishing ignition within said zones to activate said rotary kiln.

7. The process as defined in claim 6 including the step of pivoting the multiple purpose manifold about an axis of rotation, and spacing said axis of rotation a selected distance away from said longitudinal axis.

8. The process as defined in claim 7 including the step of providing each of said treatment zones with a plurality of longitudinally spaced apart burners for achieving said thermal parameters, each of said plurality burners defining a plurality of independent, spaced apart tips.

9. The process as defined in claim 6 including the steps of:

positioning said multiple purpose manifold a selected distance away from said longitudinal axis of said treatment chamber and above said feedstocks to be thermally treated; and, directing flame or gases produced by said ignition step substantially perpendicularly away from said multiple purpose manifold and substantially tangential with respect to said cylindrical wall, thereby creating a selected swirling or non-random helical-like gas stream within said treatment chamber.

10. The process as defined in claim 9 including the step of pivoting said multiple purpose manifold about an axis of rotation spaced a selected distance away from said longitudinal axis.

* * * * *